(12) United States Patent
Tao et al.

(10) Patent No.: US 8,315,473 B1
(45) Date of Patent: Nov. 20, 2012

(54) VARIABLY FAST AND CONTINUOUS BILATERAL APPROXIMATION FILTERING USING HISTOGRAM MANIPULATIONS

(75) Inventors: Michael W. Tao, Fremont, CA (US); Jen-Chan Chien, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1030 days.

(21) Appl. No.: 12/323,009

(22) Filed: Nov. 25, 2008

Related U.S. Application Data

(60) Provisional application No. 61/091,239, filed on Aug. 22, 2008.

(51) Int. Cl.
*G06K 9/40* (2006.01)
*G06K 9/00* (2006.01)

(52) U.S. Cl. ........................................ 382/260; 382/168

(58) Field of Classification Search ................... 382/260, 382/168
See application file for complete search history.

(56) References Cited

U.S. PATENT DOCUMENTS

| | | | |
|---|---|---|---|
| 4,720,871 A | 1/1988 | Chambers | |
| 4,947,446 A | 8/1990 | Jutand | |
| 5,168,375 A | 12/1992 | Reisch | |
| 5,426,684 A | 6/1995 | Gaborski et al. | |
| 5,432,893 A * | 7/1995 | Blasubramanian et al. | 345/600 |
| 5,471,987 A | 12/1995 | Nakazawa et al. | |
| 5,681,112 A | 10/1997 | Kuroda | |
| 5,870,097 A * | 2/1999 | Snyder et al. | 345/426 |
| 5,899,999 A | 5/1999 | De Bonet | |
| 6,034,690 A | 3/2000 | Gallery | |
| 6,163,621 A | 12/2000 | Paik et al. | |
| 6,347,153 B1 | 2/2002 | Triplett et al. | |
| 6,826,311 B2 | 11/2004 | Wilt | |
| 6,956,582 B2 | 10/2005 | Tidwell | |
| 7,010,163 B1 | 3/2006 | Weiss | |
| 7,031,543 B2 * | 4/2006 | Cheng et al. | 382/254 |
| 7,072,528 B2 | 7/2006 | Han | |
| 7,146,059 B1 | 12/2006 | Durand et al. | |
| 7,239,756 B2 | 7/2007 | Sartor | |
| 7,317,781 B2 | 1/2008 | Urushiya | |

(Continued)

OTHER PUBLICATIONS

Weiss, "Fast Median and Bilateral Filtering," ACM Transactions on Graphics, vol. 25, Issue 3, Jul. 2006, Proceedings of ACM SIGGRAPH 2006, pp. 519-526.

(Continued)

*Primary Examiner* — Wenpeng Chen
(74) *Attorney, Agent, or Firm* — Robert C. Kowert; Meyertons, Hood, Kivlin, Kowert & Goetzel, P.C.

(57) ABSTRACT

A system and method for performing integral histogram convolution for filtering image data is disclosed. The method may include applying a filter window to a first portion of an image, wherein the filter window includes an interior region and a border region. The method may include generating a plurality of histograms for the pixels in the filter window. The method may include generating spatial weight coefficients for the pixels in the border of the filter window. The method may include generating a plurality of color weight coefficients for the pixels in the filter window. The method may include performing a filtering operation on the pixels in the filter window by applying a respective spatial weight coefficient and a respective color weight coefficient to the values in the plurality of histograms for each respective pixel in the filter window. The methods may be implemented by program instructions executing in parallel on CPU(s) or GPUs.

31 Claims, 19 Drawing Sheets

U.S. PATENT DOCUMENTS

| | | | |
|---|---|---|---|
| 7,783,121 B1 * | 8/2010 | Cox | 382/254 |
| 7,889,923 B1 * | 2/2011 | Carr et al. | 382/168 |
| 7,889,949 B2 * | 2/2011 | Cohen et al. | 382/299 |
| 2003/0123749 A1 * | 7/2003 | Cheng et al. | 382/275 |
| 2003/0190090 A1 * | 10/2003 | Beeman et al. | 382/284 |
| 2004/0001643 A1 * | 1/2004 | Thesen | 382/260 |
| 2004/0264799 A1 | 12/2004 | Gallagher | |
| 2006/0110063 A1 | 5/2006 | Weiss | |
| 2006/0147112 A1 * | 7/2006 | Park et al. | 382/168 |
| 2006/0153444 A1 * | 7/2006 | Trimeche et al. | 382/167 |
| 2007/0183682 A1 | 8/2007 | Weiss | |
| 2008/0298680 A1 * | 12/2008 | Miller et al. | 382/168 |
| 2009/0317015 A1 * | 12/2009 | Porikli | 382/261 |

OTHER PUBLICATIONS

Paris, et al., "A Fast Approximation of the Bilateral Filter Using a Signal Processing Approach," Proceedings of the European Conference on Computer Vision, 2006.

Terdiman, "Radix Sort Revisited," 2000, http://www.codercorner/com/RadixSortRevisited.html.

Huang, "A Fast Two-Dimensional Median Filtering Algorithm," Acoustics, Speech, and Signal Processing [see also IEEE Transactions on Signal Processing], IEEE Transactions, vol. 27, Issue 1, Feb. 1979, pp. 13-18.

Huttunen, H. & Yli-Harja, O., "Fast Algorithm for Updating the Local Histogram of Multidemensional Signals," Proceedings 1999 International Symposium on Nonlinear Theory and Its Applications (NOLTA '99), Hilton Waikoloa Village, Hawaii, USA, Nov. 28-Dec. 2, 1999, pp. 65-68.

Giovanni Garibotto, Livio Lambarelli, "Fast on-line Implementation of Two-Dimensional Median Filtering," Electronics Letters, vol. 15, No. 1, Jan. 4, 1979, pp. 24-25.

U.S. Appl. No. 11/292,184, filed Nov. 29, 2005.

U.S. Appl. No. 11/749,862, filed May 17, 2007.

U.S. Appl. No. 11/756,409, filed May 31, 2007.

U.S. Appl. No. 11/756,402, filed May 31, 2007.

Williams, "Pyramidal Parametrics," Computer Graphics, vol. 17, No. 3, Jul. 1983, pp. 1-11.

Crow, "Summed-Area Tables for Texture Mapping," Computer Graphics, vol. 18, No. 3, Jul. 1984, pp. 207-212.

Fatih Porikli, "Constant time O(1) bilateral Filtering," Jul. 2008, Mitsubishi Electric Research Laboratories, Inc., 10 pages.

Ce Liu, et al., "Automatic Estimation and Removal of Noise from a Single Image," IEEE Transactions on Pattern Analysis and Machine Intelligence, vol. 30, No. 2, Feb. 2008, pp. 299-314.

U.S. Appl. No. 12/324,251, filed Nov. 26, 2008.

Qimei Hu, et al. "Mutli-scale edge detection with bilateral filtering in apiral architecture," Proceedings of the Pan-Sydney area Workshop on Visual Information Processing VIP '05, publisher: Australian Computer Society, Inc., 2004, 4 pages.

Fredo Durand and Julie Dorsey, "Fast bilateral filtering for the display of high-dynamic-range images," ACM Transactions on Graphics (TOG), Proceedings of the 29th annual conference on computer graphics and interactive techniques SIGGRAPH '02, vol. 21, issue 3, 2002, 10 pages.

* cited by examiner

100 image

| | | | | | | | | | |
|---|---|---|---|---|---|---|---|---|---|
| A1 | A2 | A3 | A4 | A5 | A6 | A7 | A8 | A9 | A10 |
| B1 | B2 | B3 | B4 | B5 | B6 | B7 | B8 | B9 | B10 |
| C1 | C2 | C3 | C4 | C5 | C6 | C7 | C8 | C9 | C10 |
| D1 | D2 | D2 | D4 | D5 | D6 | D7 | D8 | D9 | D10 |
| E1 | E2 | E3 | E4 | E5 | E6 | E7 | E8 | E9 | E10 |
| F1 | F2 | F3 | F4 | F5 | F6 | F7 | F8 | F9 | F10 |
| G1 | G2 | G3 | G4 | G5 | G6 | G7 | G8 | G9 | G10 | row 101a $j=6$
row 101b $j=5$
row 101c $j=4$
row 101d $j=3$
row 101e $j=2$
row 101f $j=1$
row 101g $j=0$ column 102a $i=0$
column 102b $i=1$
column 102c $i=2$
column 102h $i=7$
column 102i $i=8$
column 102j $i=9$

*FIG. 2A*

110 image region

| 3 | 7 | 8 |
|---|---|---|
| 2 | 3 | 7 |
| 4 | 6 | 7 |

*FIG. 2B*

100 image

| | | | | | | | | | |
|---|---|---|---|---|---|---|---|---|---|
| A1 | A2 | A3 | A4 | A5 | A6 | A7 | A8 | A9 | A10 |
| B1 | B2 | B3 | B4 | B5 | B6 | B7 | B8 | B9 | B10 |
| C1 | C2 | C3 | C4 | C5 | C6 | C7 | C8 | C9 | C10 |
| D1 | D2 | D2 | D4 | D5 | D6 | D7 | D8 | D9 | D10 |
| E1 | E2 | E3 | E4 | E5 | E6 | E7 | E8 | E9 | E10 |
| F1 | F2 | F3 | F4 | F5 | F6 | F7 | F8 | F9 | F10 |
| G1 | G2 | G3 | G4 | G5 | G6 | G7 | G8 | G9 | G10 | row 101a $j=6$
row 101b $j=5$
row 101c $j=4$
row 101d $j=3$
row 101e $j=2$
row 101f $j=1$
row 101g $j=0$ column 102d $i=3$
column 102e $i=4$
column 102f $i=5$

*FIG. 3*

| | | | | | | | | | | |
|---|---|---|---|---|---|---|---|---|---|---|
| row 101a j=6 | A1 | A2 | A3 | A4 | A5 | A6 | A7 | A8 | A9 | A10 |
| row 101b j=5 | B1 | B2 | B3 | B4 | B5 | B6 | B7 | B8 | B9 | B10 |
| row 101c j=4 | C1 | C2 | C3 | C4 | C5 | C6 | C7 | C8 | C9 | C10 |
| row 101d j=3 | D1 | D2 | D2 | D4 | D5 | D6 | D7 | D8 | D9 | D10 |
| row 101e j=2 | E1 | E2 | E3 | E4 | E5 | E6 | E7 | E8 | E9 | E10 |
| row 101f j=1 | F1 | F2 | F3 | F4 | F5 | F6 | F7 | F8 | F9 | F10 |
| row 101g j=0 | G1 | G2 | G3 | G4 | G5 | G6 | G7 | G8 | G9 | G10 | column 102d i=3
column 102e i=4
column 102f i=5

100 image

*FIG. 4*

| | | | | | | | | | |
|---|---|---|---|---|---|---|---|---|---|
| A1 | A2 | A3 | A4 | A5 | A6 | A7 | A8 | A9 | A10 |
| B1 | B2 | B3 | B4 | B5 | B6 | B7 | B8 | B9 | B10 |
| C1 | C2 | C3 | C4 | C5 | C6 | C7 | C8 | C9 | C10 |
| D1 | D2 | D2 | D4 | D5 | D6 | D7 | D8 | D9 | D10 |
| E1 | E2 | E3 | E4 | E5 | E6 | E7 | E8 | E9 | E10 |
| F1 | F2 | F3 | F4 | F5 | F6 | F7 | F8 | F9 | F10 |
| G1 | G2 | G3 | G4 | G5 | G6 | G7 | G8 | G9 | G10 | row 101a j=6
row 101b j=5
row 101c j=4
row 101d j=3
row 101e j=2
row 101f j=1
row 101g j=0 column 102e i=4
column 102f i=5
column 102g i=6

100 image

*FIG. 5*

|  | 1 | 2 | 3 | 4 | 5 | 6 | 7 | 8 | 9 | 10 |
|---|---|---|---|---|---|---|---|---|---|---|
| row 101a  j=6 | A1 | A2 | A3 | A4 | A5 | A6 | A7 | A8 | A9 | A10 |
| row 101b  j=5 | B1 | B2 | B3 | B4 | B5 | B6 | B7 | B8 | B9 | B10 |
| row 101c  j=4 | C1 | C2 | C3 | C4 | C5 | C6 | C7 | C8 | C9 | C10 |
| row 101d  j=3 | D1 | D2 | D2 | D4 | D5 | D6 | D7 | D8 | D9 | D10 |
| row 101e  j=2 | E1 | E2 | E3 | E4 | E5 | E6 | E7 | E8 | E9 | E10 |
| row 101f  j=1 | F1 | F2 | F3 | F4 | F5 | F6 | F7 | F8 | F9 | F10 |
| row 101g  j=0 | G1 | G2 | G3 | G4 | G5 | G6 | G7 | G8 | G9 | G10 | column 102e i=4
column 102f i=5
column 102g i=6
100 image

FIG. 6

| row 101a j=6 | A1 | A2 | A3 | A4 | A5 | A6 | A7 | A8 | A9 | A10 |
|---|---|---|---|---|---|---|---|---|---|---|
| row 101b j=5 | B1 | B2 | B3 | B4 | B5 | B6 | B7 | B8 | B9 | B10 |
| row 101c j=4 | C1 | C2 | C3 | C4 | C5 | C6 | C7 | C8 | C9 | C10 |
| row 101d j=3 | D1 | D2 | D2 | D4 | D5 | D6 | D7 | D8 | D9 | D10 |
| row 101e j=2 | E1 | E2 | E3 | E4 | E5 | E6 | E7 | E8 | E9 | E10 |
| row 101f j=1 | F1 | F2 | F3 | F4 | F5 | F6 | F7 | F8 | F9 | F10 |
| row 101g j=0 | G1 | G2 | G3 | G4 | G5 | G6 | G7 | G8 | G9 | G10 | column 102d i=3
column 102e i=4
column 102f i=5
100 image

*FIG. 7*

| | A1 | A2 | A3 | A4 | A5 | A6 | A7 | A8 | A9 | A10 |
|---|---|---|---|---|---|---|---|---|---|---|
| row 101a j=6 | A1 | A2 | A3 | A4 | A5 | A6 | A7 | A8 | A9 | A10 |
| row 101b j=5 | B1 | B2 | B3 | B4 | B5 | B6 | B7 | B8 | B9 | B10 |
| row 101c j=4 | C1 | C2 | C3 | C4 | C5 | C6 | C7 | C8 | C9 | C10 |
| row 101d j=3 | D1 | D2 | D2 | D4 | D5 | D6 | D7 | D8 | D9 | D10 |
| row 101e j=2 | E1 | E2 | E3 | E4 | E5 | E6 | E7 | E8 | E9 | E10 |
| row 101f j=1 | F1 | F2 | F3 | F4 | F5 | F6 | F7 | F8 | F9 | F10 |
| row 101g j=0 | G1 | G2 | G3 | G4 | G5 | G6 | G7 | G8 | G9 | G10 | column 102d i=3
column 102e i=4
column 102f i=5

100 image

*FIG. 8*

VARIABLY FAST AND CONTINUOUS BILATERAL APPROXIMATION FILTERING USING HISTOGRAM MANIPULATIONS

This application claims benefit of priority to U.S. Provisional Patent Application Ser. No. 61/091,239, filed on Aug. 22, 2008. The Provisional Patent Application is incorporated herein by reference. To the extent that anything in the Provisional Patent Application contradicts material expressly included herein, the material herein controls.

BACKGROUND

1. Field of the Invention

The present invention is directed to computer systems. More particularly, it is directed to image processing.

2. Description of the Related Art

Image processing often involves the application of various filtering operations on image data using one or more convolution operations. For example, a median filter looks at pixel values (e.g., values indicating the color and/or intensity of the pixels in an image) within a box-shaped region around each pixel and selects the median value for the resulting image (i.e., the filtered output image.) In another example, a bilateral box filter replaces the value at a pixel, (i, j, k), with a weighted sum of the pixel values in the neighborhood of the pixel. Each weight is the product of a factor dependent on the distance (in pixels) to (i, j, k) and another factor dependent on the difference in intensity between the pixels and the pixel at (i, j, k).

These and other filters are typically implemented using a series of convolution steps performed across the rows and columns of an image. These convolutions may involve large numbers of operations on subsets of the input image data, and are often implemented by applying a kernel of support over the image in a sliding window. Different techniques for speeding up convolutions on image data have been developed, including the use of histograms. A histogram may be expressed as an array of buckets whose values are dependent on the values of pixels in a given region of an image. Once computed, the histogram may be used to accelerate median filtering, bilateral filtering, and other filtering functions. For example, a histogram whose values represent counts of pixel values may be searched to find the pixel value greater than half the population (i.e., the median value). However, histograms can be expensive to generate, maintain, and operate on, especially for images and/or kernels containing a large number of pixels.

SUMMARY

A system and method for performing integral histogram convolution for filtering image data is disclosed. The method may be applied to median and bilateral filtering and/or to other filtering functions performed on image data. The method may in some embodiments include generating an initial histogram for a kernel region of an input image by merging two or more column histograms. In such embodiments, all pixels in the region may be represented in one of the columns of pixels. Each column histogram may correspond to a column of pixels one pixel wide, with a height equal to the height of the kernel region.

In some embodiments, each column histogram may include a plurality of bucket values, and each bucket value may be dependent on values of pixels in the corresponding column. For example, each bucket value may represent a sum of weights associated with pixels in the region or column having the same value, or a count of pixels in the same column having the same value, in different embodiments. In some embodiments, each bucket value in the column histograms may represent a difference between a count of pixels in two columns of pixels having the same pixel value, where the two columns are separated by a number of columns equal to the width of the kernel region.

A convolution operation (e.g., one executed as part of a filtering operation) may in some embodiments be implemented by incrementally generating a region histogram for each successive region of the image as the convolution kernel is passed over the input image. In such embodiments, a filtering operation may be applied to each region by operating on values in the corresponding region histogram to produce a result value, associated with the region, for a pixel of a second image. For example, as the kernel is passed horizontally over the image, each successive region may have dimensions equal to those of the kernel region and may overlap the previous kernel region by at least one column of pixels.

In various embodiments, each of the result values may comprise a median of the region histogram values or a weighted average of the histogram values dependent on pixel values of other pixels in the region and/or dependent on a relative location of a pixel within the region. Once the convolution function has been executed for all regions of interests, the second image (i.e., the filtered output image) may be rendered using the result values associated with each of the regions.

Generating a region histogram for each successive region in the same horizontal scan line may in some embodiments involve merging an additional column histogram with an initial or current region histogram (e.g., by adding the bucket values of corresponding buckets together), and may also involve subtracting bucket values of a preceding column histogram from the initial or current histogram.

Generating a region histogram for a kernel region in the next scan line of the image (e.g., the next scan line up) may in some embodiments include updating each column histogram in an initial (or current) histogram to reflect the presence of one or more additional pixels in the corresponding column that are included in the new region but not in the previous region. In such embodiments, the method may also include updating each column histogram in the initial (or current) histogram to reflect the absence of one or more pixels in the corresponding column that were included in the initial (or current) region but are not included in the next region, and/or updating a column histogram corresponding to a remote column separated from the current column by a number of columns equal to the width of the kernel region to reflect differences between pixels values of the column and the remote column.

Thus the method may store a histogram of pixel values of each column representing the filtering kernel's width number of rows by one column. The running histogram may be created for each subsequent row of the kernel by using a stored column histogram and subtracting a top pixel value while adding a bottom pixel value. Similarly, using a running histogram that represents the filtering kernel, the method may compute the histogram representation of a pixel and its neighbors by adding a right column histogram and subtracting a left column histogram.

The method may use color-space determination, along with the running histogram, to compute a bilateral blur value of a center pixel (of the filtering kernel) by multiplying pre-computed coefficients for each histogram value. The pre-computed coefficients may be Gaussian coefficients, or coefficients of any other distribution.

The method may also use spatial weight determination, along with the running histogram, to compute the bilateral blur value of a center pixel (of the filtering kernel) by multiplying pre-computed coefficients for each histogram value. The spatial coefficients may operate on the borders of the filtering kernel, by using a spatial function to determine contribution of those pixels to the filter. The spatial weight determination may thus eliminate any sharp discontinuities between the filtering window and the rest of the image. The nature of the spatial weight coefficients may be automatically created by the application or may be supplied by the user. Thus, the use of spatial weight coefficients may result in increasing the quality of the box approximation of the bilateral filter window, e.g., by eliminating any ghosting effect of the box approximation.

The method may use both color-space coefficients and spatial-weight coefficients to optimize the operation of the filter operation. Furthermore, the number of operations done on each pixel of the filtering kernel may be a function of the number of buckets in the histogram. Thus the number of operations may be independent the radius of the blur window.

The methods described herein may be implemented by program instructions executable by one or more general-purpose processors (CPUs) and/or one or more graphics processing units (GPUs) in different embodiments. In some embodiments, the methods described herein may be executed using vectorized instructions, such as multimedia and/or floating point extensions to further take advantage of parallel execution. In some embodiments, the vectorization may be performed using parallel and/or distributed processing instead of, or in addition to, the aforementioned multimedia and/or floating point extensions.

In some embodiments, the region and/or column histograms described herein may be generated by program instructions executing in parallel on one or more CPUs or GPUs configured for parallel execution. For example, generation of multiple region or column histograms may be performed by different threads of an application executing on a CPU configured for multi-threaded execution, or by different GPUs configured to operate in parallel. Similarly, merging operations performed on multiple histogram buckets may be performed in parallel on a CPU configured for multi-threaded execution or by different GPUs configured to operate in parallel, in different embodiments. The methods disclosed herein may be implemented by program instructions comprised on one or more computer-readable storage media computer-executable by CPU(s) and/or GPU(s), in various embodiments.

BRIEF DESCRIPTION OF THE DRAWINGS

FIG. 2A illustrates an input image, according to some embodiments;

FIG. 2B illustrates pixel values associated with a region of an input image, according to some embodiments;

FIGS. 3-8 illustrate performance of integral histogram convolution on an input image, according to some embodiments;

Figure 1A:
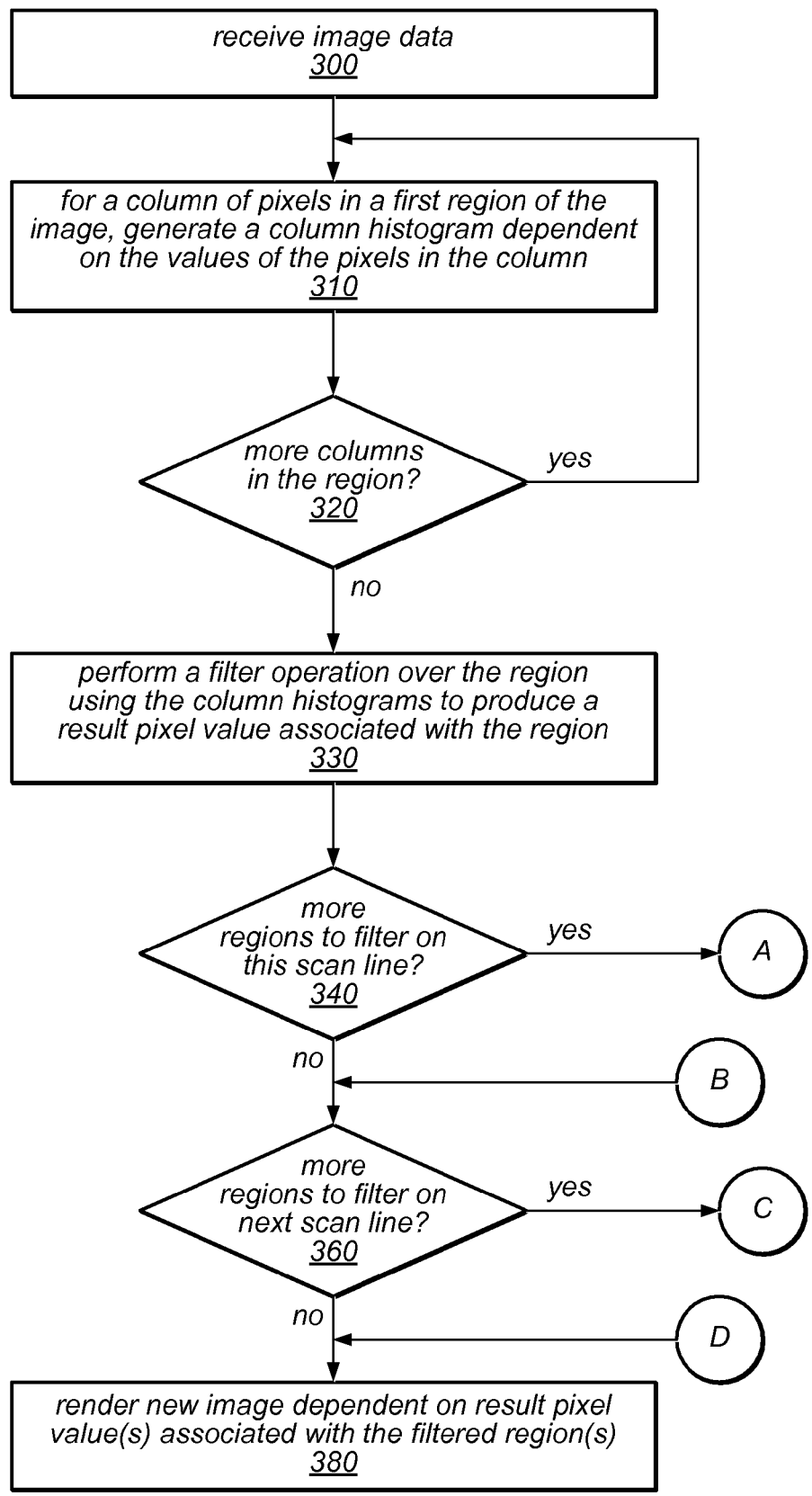
FIGS. 1A-1C illustrate a method for performing integral histogram convolution on an input image, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various computer-implemented methods disclosed herein may be used to perform fast histogram-based convolutions for image processing. The methods may be implemented as part of a graphics application that supports various filtering techniques, such as median filtering and bilateral filtering. The techniques disclosed herein may be executed on graphics processing units (GPUs) and/or CPUs, in various embodiments. For example, a graphics application may include support for filtering to achieve blurring, anti-aliasing, blending, or other filtering operations that include convolutions using histograms, as described herein.

Traditionally, convolution is performed on an input image by passing a window (also called the "support") across the image. An output pixel value corresponding to each given input pixel value may be calculated by computing a weighted sum (or other function) of all the input pixels in the window when the given pixel is in a particular position in the window (e.g., in a particular corner, or in the center of the window). The weight applied to each of the input pixels may be different for each pixel of the window. In other words, a window of some size and shape may be scanned across the image. An output pixel value may be a weighted sum of the input pixels within the window where the weights are the values of the filter may be assigned to every pixel of the window itself. The window including its weights may be referred to as the "convolution kernel."

The methods described herein for computing bilateral and median filtering for image processing may include the use of histograms. In some embodiments, histogram-based filters may be computed efficiently by processing column histograms incrementally, leading to a constant time technique for generating histograms for rectangular kernels of a constant size and shape around each pixel. This technique may be executed in constant time for box-weighted filters, in some embodiments. An extension of this basic algorithm may generate an approximation of a Gaussian-weighted spatial histogram with a cost that is linear with the radius of the kernel. This algorithm may be used to compute a spatially-weighted bilateral filter with relatively low memory requirements. The bilateral filter may be cost linear with the vertical size of the kernel, the number of buckets in a histogram, and be independent of the kernel size.

Histogram-Based Convolution

As previously noted, histogram-based convolution has been used to accelerate median and bilateral filtering in image processing. Once computed, a histogram may be searched to find the pixel value greater than half the population (i.e., the median), or the histogram may be used to compute a box-bilateral filter (as described in more detail below). A histogram may be expressed as an array of buckets whose values are dependent on the values of pixels in a given region of an image. For example, the value of each bucket may correspond to a count of the number of pixels in a source population (i.e. a region of pixels) that have a given value or range of values. In some such embodiments, there may be a linear mapping between a bucket index and the pixel value being counted. In the case of 8 bit images, for example, pixel values from 0 to 255 may map to a bucket index having corresponding values from 0 and 255.

Histogram-based convolution may involve generating such a histogram for a range of pixels corresponding to the convolution kernel. For example, for a source set of image pixels I (having coordinates i, j), in a kernel of width $D_X$ and height $D_Y$, each of the values H[b] (representing the "height" of a histogram for one bucket entry) may be computed as:

$$H[b]=\Sigma_{i_0}^{i_n}\Sigma_{j_0}^{j_m}\phi(I[i,j]-v(b))$$

In the equation above, $\phi$ represents the delta function that returns a value of 1 for an argument of 0, and 0 otherwise; b represents the bucket index; v(b) represents the pixel value that corresponds to the bucket index b for the given range of pixels; I(i,j) represents the pixel value for the source pixel at coordinates (i,j); $i_n=i_0+D_x-1$; and $j_m=j_0+D_y-1$. In other words, in this example, the height of the histogram for each bucket index is equal to a count of the pixels in the region whose value matches the pixel value that corresponds to the bucket index value.

For a median filtering operation, such a histogram may be searched to find the pixel value within a region that is greater than half the population (i.e., the median).

For a box bilateral filter, the pixels within the rectangular filter kernel may be averaged together based on a weighting function that depends on the source pixel values (e.g., the color value or intensity value). The filtered output value may also depend on a spatially varying term that depends on the value of the pixel at the center pixel of the kernel (at coordinates $i_C$, $j_C$), called $I_C$. In general, the filtered output value may be expressed as a ratio of the sum of weighted values of the pixels in the neighborhood of a given source pixel divided by the sum of those weights (i.e., as a weighted average).

The filtered output $F_{i0,j0}$ for a box bilateral filter may in some embodiments be computed using a histogram to compute the sum of the weights (w) and the sum of the weighted values ($w_c$) as follows:

$$w=\Sigma_{b=0}^{b=B}W(v(b),Ic)H(b)$$

$$w_c=\Sigma_{b=0}^{b=B}W(v(b),Ic)H(b)v(b)$$

$$F_{i0,j0}=\frac{w_c}{w}$$

In this example, W represents a weighting function that is dependent only on the pixel value of each source pixel and not on the pixel location. The cost of direct evaluation of a box bilateral filter operation may be proportional to the number of pixels in the rectangular region. However, when using a histogram (as above) the cost may be linear with the number of buckets B, but independent of the spatial size of the kernel. Therefore, this technique may be especially efficient for computing region histograms for box bilateral filtering of large kernels.

Note that, as used in the remaining examples herein, the value v(b) is assumed to be equal to b (i.e., the bucket index). In other words, integer input pixel values are assumed, with each integer value corresponding to the bucket index. For example, the pixel value corresponding to the bucket with index 0 is a pixel value of 0, the pixel value corresponding to the bucket with index 1 is a pixel value of 1, and so on. Therefore, the histogram may in such embodiments be computed as:

$$H[b] = \Sigma_{i_0}^{i_n} \Sigma_{j_0}^{j_m} \phi(I[i,j] - b)$$

Note that in other embodiments, the bucket index and corresponding pixel values may have a different relationship.

A scatter operation may be used to generate a histogram (i.e., to "fill" the buckets of the histogram according to the pixel values of the pixels in a region of interest). Using the assumption above, for a rectangular source region from $(i_0, j_0)$ to $(i_n, j_m)$, the scatter operation $S(i_0, i_n, j_0, j_m)$ may be defined using the following pseudo-code example:

For i from $i_0$ to $i_n$
{
  For each j from $j_0$ to $j_m$
  {
    $H[I(i,j)] += 1$
  }
}

In other words, for each pixel in the region, increment the bucket value corresponding to the value of that pixel. Direct evaluation using this technique comes at a cost that is proportional to the number of pixels in the rectangular region of interest.

Integral Histogram Convolution

In some embodiments, a histogram H for the same rectangular source region may be represented as an array of histograms, one for each column of pixels. In such embodiments, the value of the histogram for each column represented by its index i (which may be dependent on its horizontal position on a single scan line) may be defined as:

$$h_i(b) = S(i, i, j_0, j_m)$$

The histogram of the rectangular region H, in some embodiments, may be computed as the merger of the histograms for its sub-regions (i.e., its columns). For example, to compute $H_{i_0}(b)$ for the rectangular region from $(i_0, j_0)$ to $(i_n, j_m)$, the column histograms for columns $i_0$ to $i_n$ may be combined (e.g., added together):

$$H_{i_0}(b) = \Sigma_{i=i_0}^{i_n} h_i(b)$$

The cost of such a summation for each source region of an input image may be linear in the horizontal resolution of the kernel with the number of buckets in each histogram. For example, in some embodiments the cost may be computed as the number of buckets times the cost of accessing and accumulating an entry in the histogram.

In some embodiments, a new histogram may be computed for each other region in a same scan line by combining an initial region histogram with the column histogram for a next horizontal location in the scan line and removing the contribution of a column histogram no longer within the source region of interest. For example, the region histogram for a source region of the same dimensions as that computed above, but in a next horizontal position on the same scan line (e.g., for a rectangular kernel shifted to the right by one pixel), where r is the kernel radius, may be computed as:

$$H_{i_0+1}(b) = H_{i_0} + h_{i_2+1}(b) - h_{i_0}(b)$$

In the example above, the histogram for the region starting at the next pixel (horizontally) may be computed by adding one column histogram and subtracting another column histogram (e.g., a preceding column histogram) from the initial histogram (i.e., the histogram for the initial kernel position). This may be equivalent to running a constant cost box filter on the bucket entries along a scan line.

Figure 1B:
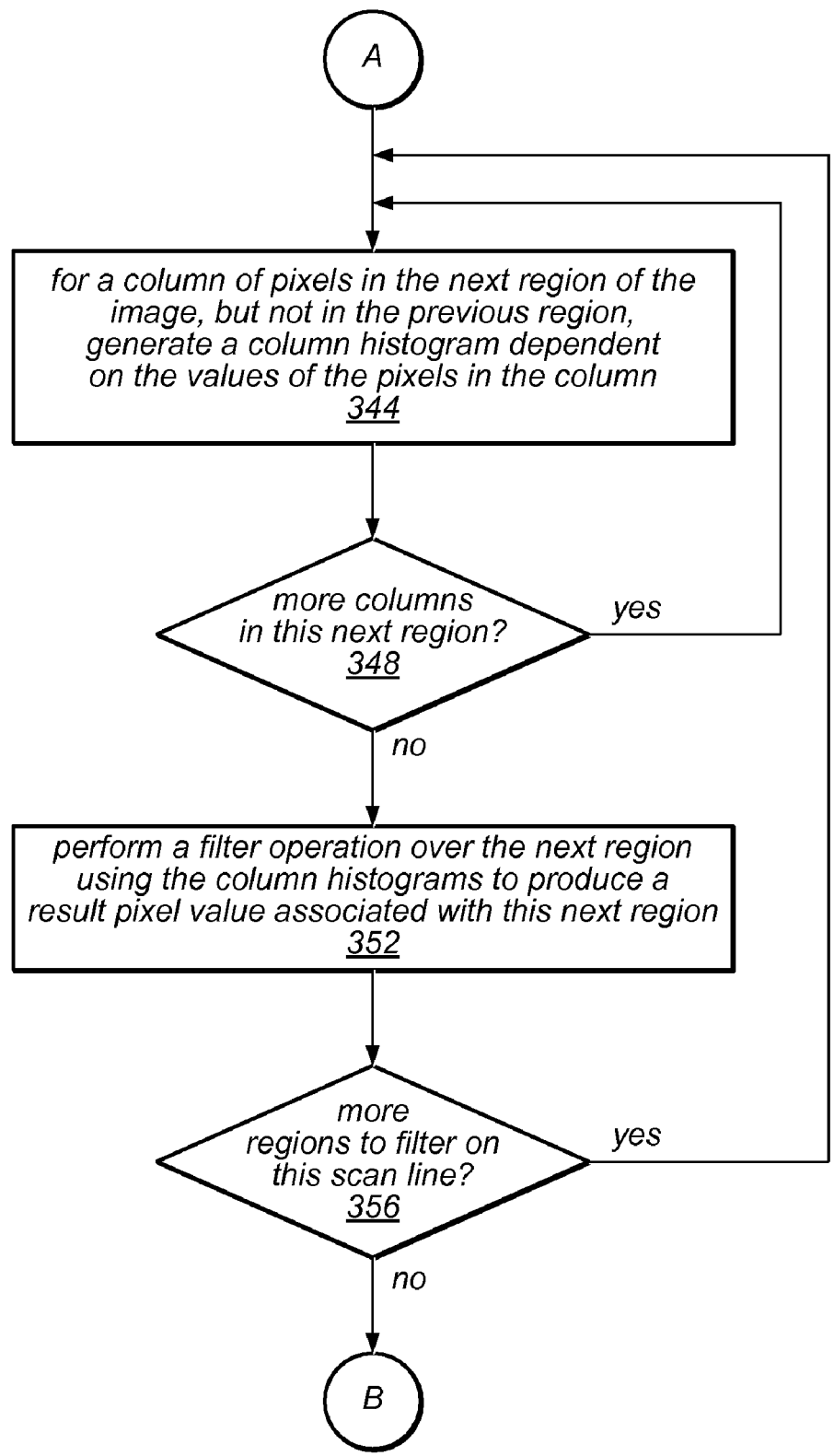
Figure 1C:
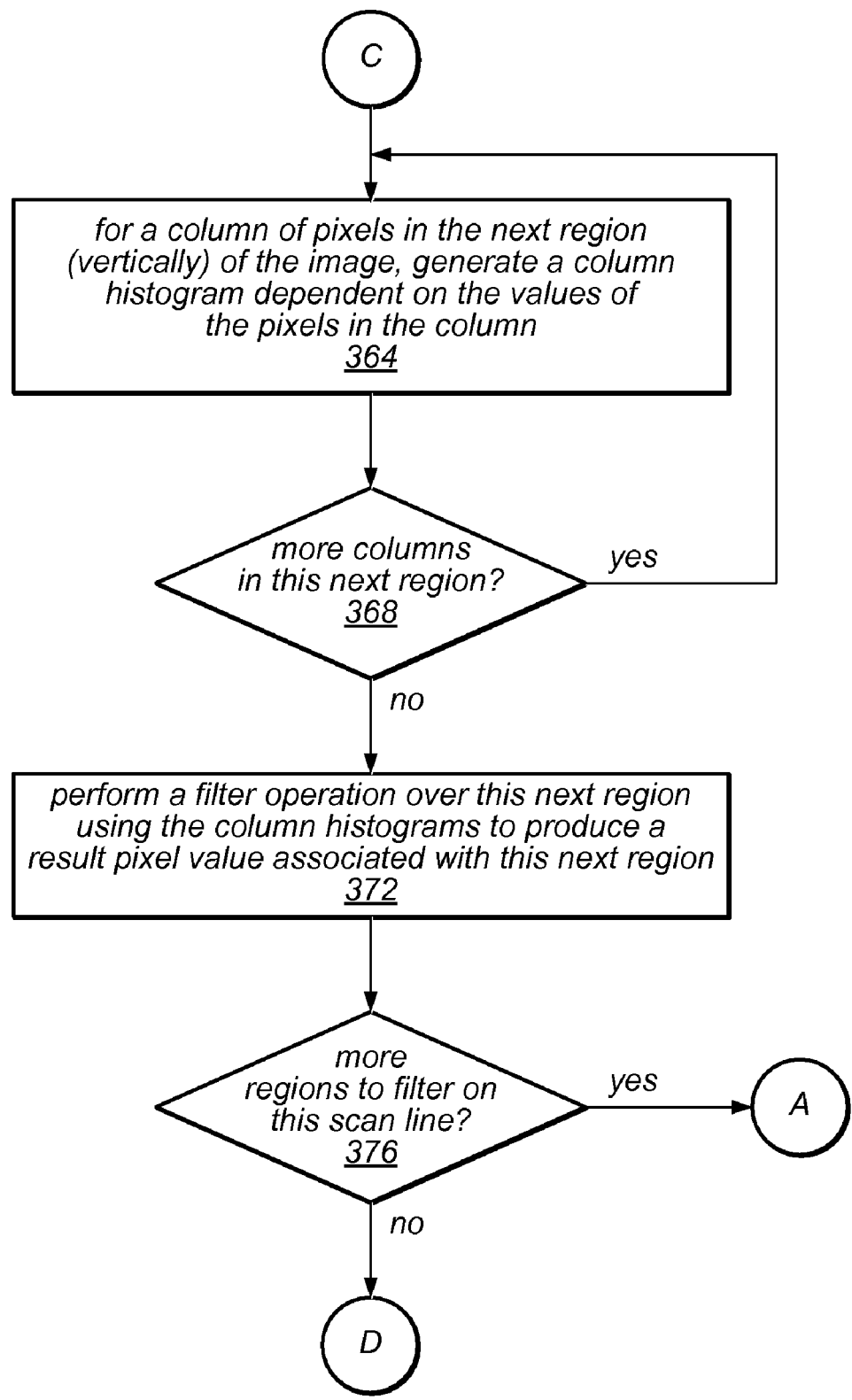

A method for computing a histogram for a source image that may be represented by columns of pixels, according to one embodiment, is illustrated by the flow charts in FIGS. 1A-1C. In this example, image data may be received, as in 300. For example, an image processing application may receive image data when a source image is opened within the application for processing, or the image data may be image data that has already been modified by the image processing application (i.e., it may not correspond to original image data), in different embodiments.

As illustrated at 310, the method may include generating a column histogram for a column of pixels in a first region of the source image. For example, a filtering function may be configured to perform a convolution on a rectangular kernel of the image having a width of 10 pixels and a height of 20 pixels. This kernel may in some embodiments be passed over the source image in the horizontal direction in order to apply the filtering function to the pixels on a same scan line. The first region of the source image may correspond to the kernel being in the first position over the source image. In the example illustrated in FIG. 1A, the values in a column histogram of this first region may be dependent on the values of the pixels in the column. For example, as described above, the values in the column histogram may in some embodiments represent an array of bucket values, and each may represent a count of the pixels in the column having a given pixel value. In other embodiments, the values in the column histogram may represent a sum of weights or a weighted count of the pixels in the column having a given pixel value, or may have a different relationship with the pixels values in the column.

After computing a column histogram for the first column in a kernel region, the method may include determining if there are more columns within the kernel region, as in 320. If there are, illustrated by the positive exit from 320, the method may include generating a column histogram for the next column of pixels in the first region, as illustrated in 310 and described above. As illustrated in FIG. 1A, the operations at 320 and 310 may be repeated for all the columns in the first region.

Once all of the column histograms for the first region have been generated, illustrated by the negative exit from 320, the method may include performing a filter operation over the region using the column histograms to produce a result pixel value associated with the region, as in 330. In some embodiments, this may involve performing a convolution operation on the region histogram represented as the merger of the column histograms corresponding to the region. For example, if the filtering operation is a median filter and each bucket value in the column histograms represents a count of the number of pixels in the column having the same value, the column histograms may be added together and the bucket values searched to find the median pixel value for the entire region. In other words, the bucket values in each column histogram may be added to the corresponding bucket values in the other column histograms to produce a region histogram having bucket values equal to the sum of the corresponding bucket values of all of the column histograms. The values in the buckets of the region histogram may then be searched to find the pixel value greater than half the population (i.e., the median). The result pixel value (i.e., the median value) may represent a new pixel value for one of the pixels in the filtered image output corresponding to one of the pixels in the first region (e.g., a corner or center pixel of the region, in some embodiments).

As illustrated in FIG. 1A, the method may include determining if there are any more regions to which the filtering function should be applied on the same scan line, as in 340. For example, in some embodiments, a convolution kernel may be applied to successive regions of the source image by shifting the kernel horizontally across one scan line of the image, as describe above. If there are more regions to be filtered on the same scan line, shown as the positive exit from 340, the method may include performing the operations illustrated in FIG. 1B, beginning at "A".

As illustrated in FIG. 1B, when a convolution kernel is shifted horizontally over a next region of the source image (e.g., a region largely overlapping the first region), the method may include generating a column histogram for a column of pixels in the next region that was not included in the first region, as in 344. For example, if the kernel is shifted one pixel to the right of its original position, one column of pixels may be included in the new region that was not included in the first region of the image. As illustrated in FIG. 1B, a column histogram may be generated dependent on the values of the pixels in this additional column.

The method may include determining if there are additional columns of pixels in the next region that were not included in the first region, as in 348. For example, in some embodiments, the convolution kernel may be shifted by more than one pixel, thus more than one additional column may be included in the next region, but not in the first region. If there is an additional column in the next region, shown as the positive exit from 348, the method may include generating a column histogram for the additional column, as in 344. As illustrated in FIG. 1B, the operations at 348 and 344 may be repeated until column histograms have been generated for all additional columns in the next region. In this example, a histogram for the next region may be represented as the merger of the column histograms corresponding to the next region. For example, the bucket values in each additional column histogram may be added to the corresponding bucket values in the first region histogram to produce a region histogram for the second region having bucket values equal to the sum of the corresponding bucket values of all of the column histograms included in the second region.

Note that in some embodiments, the method for generating the second region histogram may also include removing any column histograms corresponding to columns of pixels that were included in the first region, but are not included in the second region (not shown). For example, the bucket values of a column histogram corresponding to a column of pixels that was included in the first region but is not included in the second region may be subtracted from the corresponding bucket values in the first region histogram. This is described above using the equation, where r is the kernel radius:

$$H_{i0+1}(b)=H_{i0}+h_{i2r+1}(b)-h_{i0}(b)$$

As illustrated in FIG. 1B, once the region histogram has been computed, the method may include performing a filtering function over the second region using the values of the second region histogram (i.e., the merged column histograms for the second region), as in 352. As described above, the filtering function may be used to produce a result pixel value associated with the second region, in some embodiments.

As illustrated at 356, the method may include determining if there are more regions to filter on the same scan line of the source image (e.g., if the convolution kernel is to be shifted horizontally one or more additional times). If so, indicated as the positive output of 356, the method may include repeating the operations shown as 344-352 for the one or more additional regions, and producing a result pixel value associated with each of the regions. Once there are no more additional regions to filter on the same scan line, shown as the negative exit from 356, the method may proceed as shown in FIG. 1A, beginning at "B", in this example.

As illustrated in FIG. 1A, the method may include determining if there are more regions to filter on the next scan line, as in 360. For example, in some embodiments a convolution kernel may be shifted horizontally (e.g., one pixel to the right) until reaching the end of one scan line, and then may be shifted vertically (e.g., one pixel up) from the last position on the first scan line. In such embodiments, the kernel may then be shifted one position to the left on the second scan line until reaching the beginning of the second scan line, and the operations illustrated in FIG. 1B may be repeated in the opposite direction to produce a result pixel value for each successive region as the kernel is passed horizontally to the left. For example, each time the kernel is shifted to the left, an additional column histogram may be generated and added to the current region histogram, and in some embodiments a column histogram may be computed and/or subtracted from the current histogram, in various embodiments.

If it is determined that there are more regions to filter on a next scan line, shown as the positive exit from 360, the method may in some embodiments continue as illustrated in FIG. 1C, beginning at "C". In this example, a region histogram may be generated for a first region on the next scan line (e.g., for a region included in a convolution kernel shifted one pixel up from a previously filtered region). To compute this region histogram, column histograms may be generated corresponding to the pixels in the columns of the next vertical region, dependent on the values of the pixels in the column. This is shown as 364. In such embodiments, a column histogram in the new region histogram may be generated by adding a pixel value for a pixel included in a column of the new region to the column histogram at the same horizontal position in a previously filtered region. In other words, a value of one of the buckets of a column histogram generated for a previous region may be updated dependent on the value of a pixel in the same horizontal position, but on the scan line above the previous kernel region. In some embodiments, a value of one of the buckets of the column histogram may also be updated dependent on a pixel value for a pixel in the same horizontal position, but on the scan line below the new position of the kernel region.

As illustrated at 368, the method may include determining if there are more columns in the new region for which column histograms should be generated. If so, shown as the positive exit from 368, the operations illustrated at 364 and 368 (and described above) may be repeated for the other columns in the new region. If not, shown as the negative exit from 368, the method may include performing a filter operation on the new region to produce a result pixel value associated with the new region, as in 372. Performing a filter operation on the new region may involve performing the same operations on the column histograms making up the new region that were performed on the column histograms of the first region and/or any additional regions on the first scan line, as described above.

As illustrated in FIG. 1C, the method may include determining if there are more regions to be filtered on the same (i.e., the second) scan line, as in 376. If so, the method may continue as illustrated on FIG. 1B, beginning at "A" and returning to the operations illustrated in FIG. 1A at "B." For example, a convolution kernel may be shifted up by one pixel (as described in FIG. 1C) and then horizontally across the second scan line in much the same manner as it was shifted across the first scan line. Note that in some embodiments, the direction in which the convolution kernel may be shifted horizontally may alternate by scan line, while in others the direction in which the kernel is shifted horizontally may always be the same. For example, in some embodiments, when passing the convolution kernel over regions associated with the second and subsequent scan lines, the kernel may begin on the same edge of the source image as for the first scan line (e.g., the convolution kernel may always begin at the left edge of a new scan line and be shifted horizontally to the right). In such embodiments, an initial region histogram may be generated for the first region on each scan line in the same manner as the region histogram was generated for the first region, or a first region histogram associated each current scan line may be stored in a memory for use in generating the first region histogram on the subsequent scan line before being discarded. Note also that in some embodiments any or all region and/or column histograms may be pre-computed using the methods described herein and stored in a memory for later use in histogram merging as part of various filtering operations. In other embodiments, any or all region and column histograms may be computed during execution of a filtering operation that uses the histogram values. In such embodiments, each column and/or region histogram may be computed only when it is needed, and once computed, it may or may not be stored in memory for later use.

As illustrated in FIG. 1C, once all regions of the source image have been filtered (i.e., once the convolution kernel has been passed over the image for all horizontally and vertical positions of interest), the method may continue as illustrated in FIG. 1A at "D". In this example, the method may include rendering a new image dependent on the result pixel values produced by performing the filtering function on each region as the convolution kernel was passed over it. This is illustrated at 380. For example, if the filtering function performed was a median filter and each result pixel produced represents a median value of the pixels in the region surrounding each input pixel in the original image, a new image may be rendered in which each original pixel is replaced by the result pixel corresponding to the median value for the pixels in a kernel-sized region surrounding the pixel.

Note that in different embodiments, filtering at the far edge of an image may be handled in different ways. For example, a filtering operation that replaces a pixel value with a new value dependent on the values of the pixels surrounding it in a rectangular region may in some embodiments perform its convolutions for a pixel on the far right column as if another column with the same pixel values exists just past the far right edge (e.g., it may assume the presence of another column histogram with the same values as the previous column histogram), or as if another column exits having pixel values that are the average of the values of the corresponding pixels in two or more previous columns for which column histograms have been computed. In other embodiments, filtering operations may use only the available image pixels in the convolution (e.g., ignoring any non-existent columns to the right of the pixel of interest). Other methods of handling histogram-based convolutions at the edges of an input image may be employed in other embodiments.

The methods described above may be further clarified using the examples illustrated by FIGS. 2A-2B, and FIGS. 3-8. FIG. 2A illustrates a source image 100 that includes seven rows 101 of ten pixels each, on which a median filtering operation or another filtering operation may be performed. In this example, a convolution kernel having a width of three pixels and a height of three pixels is shown as a bold outline around pixels E1, F1, G1, E2, F2, G2, E3, F3, G3 in columns 102a-102c and rows 101e-101g. In this example, the values of these pixels (e.g., the values representing a color and/or intensity of these pixels in input image 100) are as illustrated in image region 110, shown in FIG. 2B. In this example, the value of pixel G1 is 4, the value of pixel F1 is 2, the value of pixel E1 is 3, and so on.

In this example, a histogram of image region 2B may in some embodiments include 256 buckets corresponding to 8-bit color values ranging from 0-255, where each bucket may be indexed by a corresponding index value. Each bucket value may correspond to a count of the number of pixels having the same value as the index value. Note that in other embodiments, column and/or region histograms may have values corresponding to a sum of weights or a weighted count of pixels, or may be dependent on pixel values in another way. In this example, the bucket having index 0 may be used to count the number of pixels in the region having the color value 0, the bucket having index 1 may be used to count the number of pixels in the region having the color value 1, and so on. In this example, a region histogram for image region 110 may include a bucket2 having a value of 1 (since only one pixel has the value 2), a bucket3 having a value of 2 (since two pixels have a value of 2), a bucket4 having a value of 1, a bucket6 having a value of 1, a bucket7 having a value of 3, a bucket8 having a value of 1, and all other buckets having indexes between 0-255 (other than those listed) having a value of 0 (since no pixels in the region have those values).

The median value of the pixels in image region 110 may be determined by searching the region histogram to find the pixel value greater than half the population. In this example, there are nine pixel values: 2, 3, 3, 4, 6, 7, 7, 7, and 8. Thus, the median value is 6. This may be determined using the region histogram by starting at the first bucket and adding up the values in each bucket until half of the pixels in the region are accounted for. In other words, the method may include looking at the value of bucket0 (0), and adding the values of each successive bucket until the total exceeds one half of the number of pixels (i.e., until the total equals 5, in this example). In this example, the values of bucket0 (0), bucket1 (0), bucket2 (1), bucket3 (2), bucket4 (1), bucket5 (0), and bucket6 (1) may be added together to reach a total of 5. The last bucket (bucket6) corresponds to a pixel value of 6, which is the median pixel value.

The methods illustrated in FIGS. 1A-1C for performing various filtering operations using region histograms incrementally built from column histograms may further explained using the examples below. FIG. 3 illustrates an image 100, which may be the same image depicted in FIG. 2A or may be a different image. In this example, a convolution kernel is shown as a bold outline around pixels D4, E4, F4, D5, E5, F5, D6, E6, F6, on rows 101d-101f, and in columns 102d-102f.

As described above, a region histogram for this region may be computed as the merger of column histograms representing the columns of pixels in the region. This is illustrated in FIG. 4. In this example, the region outlined in bold may be represented by three column histograms. The first column histogram may be dependent on the pixel values of the three pixels in column 102d having column index i=3, and row indexes of j=1, j=2, and j=3, the second may be dependent on the pixel values of the three pixels in column 102e (having column index i=4, and row indexes of j=1, j=2, and j=3), and the third may be dependent on the pixel values of the three pixels in column 102f having column index i=3, and row indexes of j=1, j=2, and j=3, respectively. Column histograms may be generated for each of these columns of pixels as described above. For example, the values in a column histogram may represent a count or weighted count of pixels in the column having a given pixel value (e.g., a value equal to the bucket value), or a sum of weights, in various embodiments. These column histogram values may be merged to produce a region histogram for the kernel region and may be used to perform a filter operation on this region of image 100, as described herein. For example, a median value may be produced for the region outlined in bold and the result pixel value may replace the pixel value in the center of the kernel (e.g., the value of E5, having indexes i=4 and j=2) in a filtered output image.

As described above, in some embodiments, filtering of an image 100 may involve passing a convolution kernel over an image by shifting it horizontally and/or vertically, and performing the filtering function on each successive region of the image to produce result pixel values for a filtered output image. FIG. 5 illustrates that the convolution kernel shown in FIG. 4 has been shifted one pixel to the right. The new region, outlined in bold, now includes the pixels D5, E5, F5, D6, E6, F6, G4, G5, and G6 on rows 101d-101f and in columns 102e-102g. A region histogram for this new region may be computed by merging three column histograms, in this example. The first column histogram may be dependent on the pixel values of the three pixels in column 102e having column index i=4, and row indexes of j=1, j=2, and j=3, the second may be dependent on the pixel values of the three pixels in column 102f having column index i=5, and row indexes of j=1, j=2, and j=3, and the third may be dependent on the pixel values of the three pixels in column 102g having column index i=6, and row indexes of j=1, j=2, and j=3, respectively.

As illustrated in FIG. 6, the new region includes two of the columns of pixels that were included in the previous region, plus one additional column of pixels (in column 102g). As described above, a region histogram for this region may in some embodiments be computed in part by generating a column histogram for the three pixels in column 102g. This new column histogram may then be merged with the region histogram of the previous region, and the column histogram for the three pixels in column 102e that are no longer included in the region (shown outlined with a dashed line) may be removed from the previous histogram to generate a region histogram for the new region outlined in bold in FIGS. 5 and 6. For example, the values in the buckets of the new column histogram may be added to the corresponding buckets of the previous region histogram and the values in the buckets of the column 102d histogram may be subtracted from the corresponding buckets of the previous region histogram to generate the region histogram for the new region. The new region histogram values may in some embodiments be used in performing various filtering operations on this region of image 100, as described herein.

FIG. 7 illustrates a case in which the convolution kernel is shifted vertically, rather than horizontally from its position in FIG. 4. In this example, the new region, now outlined in bold, includes the pixels C4, D4, E4, C5, D5, E5, C6, D6, and E6 on rows 101e-101g and in columns 102d-102f. A region histogram for this new region may be computed by merging three column histograms, in this example. The first column histogram may be dependent on the pixel values of the three pixels in column 102d having column index i=3, and row indexes of j=2, j=3, and j=4, the second may be dependent on the pixel values of the three pixels in column 102e having column index i=4, and row indexes of j=2, j=3, and j=4, and the third may be dependent on the pixel values of the three pixels in column 102f having column index i=5, and row indexes of j=2, j=3, and j=4, respectively. These columns of pixels in the new region are outlined in bold in FIG. 8.

As illustrated in FIG. 8, each column of the new region includes an additional pixel not included in the previous region (pixels C4, C5, and C6, in columns 102d, 102e, and 102f, respectively) and does not include one pixel that was included in the previous region (pixels F4, F5, and F6, in columns 102d, 102e, and 102f, respectively). To compute the three column histograms for this new region, each of the column histograms of the previous region may be updated to include the value of the additional pixel on row 101c and to remove the value of the pixel on row 101f, in this example. In other words, for a pixel from the next scan line up in a column i with value b, the corresponding bucket value $h_i(b)$ may be incremented, and for the pixel in column i on the scan line now below the vertical range of the kernel with a value b', $h_i(b')$ may be decremented. In the example illustrated in FIG. 8, the bucket value $h_3(b)$ corresponding to the value b of pixel C4 (which is now included in the region) may be incremented and the bucket value $h_3(b')$ corresponding to the value b' of pixel F4 (which is not included in the new region) may be decremented for the column histogram of the new region having index i=3. Similar updates may be made to the column histograms of the new region having indexes of i=4 and i=5, in this example. The resulting column histograms may in some embodiments be merged to produce a region histogram for the new region on which a filtering operation may be performed.

The operations illustrated in these examples may in some embodiments be repeated as the convolution kernel is shifted horizontally and/or vertically over image 100, as described above, to produce result pixel values corresponding to each region for use in rendering a filtered output image.

A variation of the method described above may in some embodiments require doing a little more work when moving from scan line to scan line, but may involve less work in merging the resulting histograms. In such embodiments, for a pixel from the next scan line up in a column i with value b, the corresponding bucket value $h_i(b)$ may be incremented as described above, but in addition, a corresponding bucket value in a remote column histogram may be decremented. For example, the bucket value $h_{i+Dx}(b)$, where $D_x$ is the width of the kernel, may be decremented. Similarly, for the pixel in column i on the scan line now below the vertical range of the kernel with a value b', $h_i(b')$ may be decremented and $h_{i+Dx}(b')$ may be incremented. In the example illustrated in FIG. 8, the bucket value $h_3(b)$ corresponding to the value b of pixel C4 (which is now included in the new region) may be incremented and the bucket value $h_6(b)$ corresponding to the value b of pixel C4 may be decremented (since the value of $D_x$ is 3, in this example). Similarly, the bucket value $h_3(b')$ corresponding to the value b' of pixel F4 (which is not included in the new region) may be decremented and the bucket value $h_6(b')$ corresponding to the value b' of pixel F4 may be incremented, in this example.

This variation may in some embodiments include two additional operations per pixel over the method described above when shifting the kernel vertically, but may have the effect of reducing the amount of work required to combine histograms when shifting the kernel horizontally across the image. For example, in such embodiments, the equation for computing a new region histogram from a previous region histogram when moving one pixel horizontally, where r is the kernel radius, may be given as:

$$H_{i0+1}(b) = H_{i0} + h_{i2r+1}(b)$$

As shown in the equation above, in embodiments employing this variation, the method may include computing a new region histogram by merging a previous region histogram with an additional column histogram, without having to subtract a column histogram. Instead, the additional operations performed when computing each column histogram may result in each column histogram representing a difference between histograms rather than the column histogram merely being dependent on pixel values in the current column. In some such embodiments, column histograms (e.g., column histograms including negative values) may be computed for one or more columns past the far edge of the input image, and may be used by various filtering techniques to produce filtered output values for the pixels in one or more of the last columns of the input image. For example, if the convolution kernel has a width of 2R pixels, an additional 2R−1 column histograms may be computed corresponding to non-existent columns of pixels in the input image. These additional column histograms may correspond to column indexes beginning at 2R (i.e., just past the far edge of the input image). Similarly, in some embodiments, column histograms may be generated corresponding to 2R−1 additional columns with index values beginning at a horizontal position of −2R+1 before the leading edge of the input image.

Fast Bilateral Filter

Figure 9A:
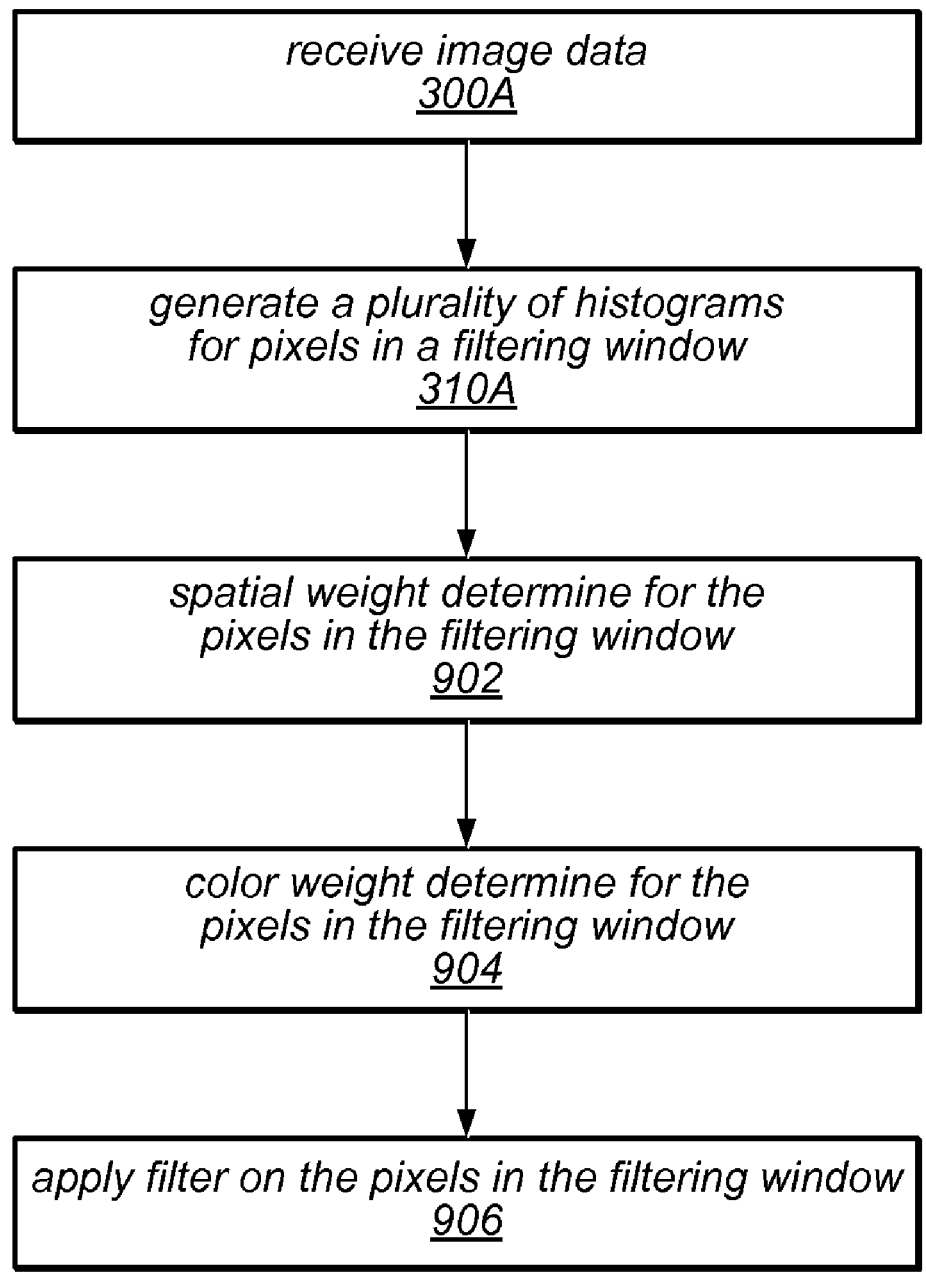
FIG. 9A illustrates a method for filtering an image, according to some embodiments.

In some embodiments, the method may include performing histogram manipulations. The method shown in FIG. 9A may be used in conjunction with any of the computer systems or devices shown in the other Figures, among other devices. In various embodiments, some of the method elements shown may be performed concurrently, in a different order than shown, or may be omitted. Additional method elements may also be performed as desired. As shown, this method may operate as follows. The method, such as shown in FIG. 9A, may include calculating a plurality of histograms, calculating spatial weight determinations, calculating color weight determinations, and applying a filter, such as a bilateral filter. The method of FIG. 9A may be used in conjunction with histogram generation, such as described with reference to FIGS. 2-8 and/or 9B-9G.

With reference to FIG. 9A, an image may be received by an image processing application in 300A. For example, the image processing application may receive image data corresponding to the image when a source image is opened within the image processing application for processing, or the image data may be an image that was already modified by the image processing application (i.e., it may not correspond to original image data).

In 310A, a plurality of histograms may be generated for the image data. Specifically, a filter window may be applied to the image. The filter window may be moved across the image, e.g., from left to right and top to bottom, until substantially all the image data has been processed. The image processing application may calculate histograms for most or all of the pixels in the image, e.g. by calculating the plurality of histograms for most or all of the pixels in the filter window and then by moving the filter window around the image. As mentioned, the plurality of histograms can be used to apply a filter, such as a bilateral filter, to the pixels in the window.

In some embodiments, the filter window may calculate values based on its center pixel, i.e., relative to a predetermined pixel substantially in center of the filter window. The distance between the center pixel and the edge of the filter window may be referred to as the window radius.

In some embodiments, there may be a running histogram for each of the pixels operated by the filter window. In some embodiments, there may also be one or more additional histograms being computed, such as a running spatially weighted pixel histogram that may represent any pixels affected by the spatial weight; this is discussed below with reference to element 902. Furthermore, each pixel may have an associated column histogram that represents the running histogram, in other words, the running histogram may be stored for each pixel. In some embodiments, the running histograms may be stored using an array, but other storage methods are contemplated instead of, or in addition to, arrays, such as using lists, queues, pointers, and/or other data types.

In 902, the method may determine spatial weight for most or all of the pixels in a filter window. This calculation may produce distribution of spatial weight for the pixels in the filter window. This spatial weight distribution may be then used to calculate coefficients for each of the elements that represent the specific histogram bucket's accumulated spatial weight. This is described in more detail below.

In 904, the method may determine color range for most or all of the pixels in a filter window. This calculation may produce distribution of color range for the pixels in the filter window. This color range distribution may be then used to calculate coefficients for each of the elements that represent the specific histogram bucket's accumulated color range. This is described in more detail below.

In 906, the method may apply a filter to the one or more pixels in the filtering window. The filter may comprise a bilateral filter that uses one or more of the spatial weight and the color weight as determined above in 902 and 904 to calculate an output value for each center pixel of the filtering window. Thus the method may use one or more histograms, such as a current running histogram, to compute the output value by considering the color range and spatial coefficients.

Figure 9B:
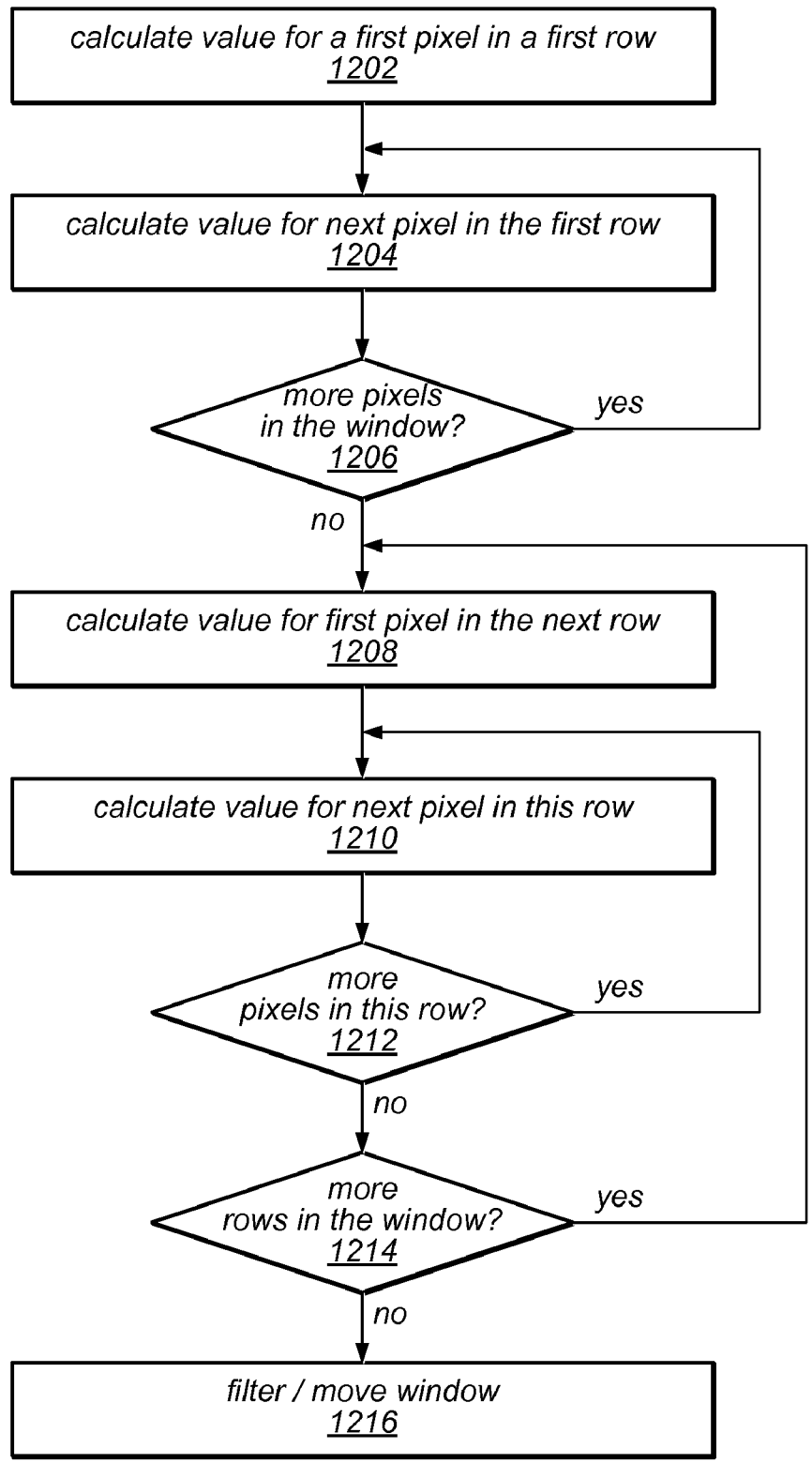
FIG. 9B illustrates a method for computing a new histogram, according to some embodiments.

With reference to FIG. 9B, in some embodiments, there may be four or more stages to creating histograms; however, some of these stages may be skipped and/or combined. Also, additional stages in histogram creation are contemplated.

In some embodiments, a first stage 1202 in histogram creation may include calculating a histogram for a first pixel in the filter window. For example, with reference to FIG. 2A, the first calculation may be for the pixel marked E1. However, calculating pixels starting from the bottom left corner, or any other location, is also contemplated; the top left corner is chosen for exemplary purposes only. The value for the first pixel may be calculated by parsing through every pixel in a specified radius window and determining where each pixel lies in the histogram. If the pixel for which the histogram is being computed is on the corner of the image, there may not be any pixels outside of the image; in these cases, in some embodiments, there may be some padded image data that may be used for calculations. The padded data may be similar to the image data at the edge of the image, or it may be an average of the image data in the filter window, or it may be any other type of padding data.

In some embodiments, the value of the running histogram may be stored for that pixel, e.g., using an array data structure. The calculations of the first pixel may take the following exemplary form, although it is noted that the below pseudo-code is shown for explanation purposes only.

for (x=−radius; x<=radius; x+=1) {
  for (y=−radius; y<=radius; y+=1) {
  Running Histogram[pixel value at (x,y)]+=1;
  Column (x) Histogram [pixel value at (x,y)]+=1;
  }
}

In 1204, a value may be calculated for the next pixel in the first row. In some embodiments, for each of the pixels after the first, the running histogram may be updated by adding pixel values of the column that is going to be added (i.e., column to the right) and deleting pixel values of the column that is going to be removed (i.e., column to the left). As mentioned above, the method may add a column to the right and delete a column to the left, but depending on where the initial pixel is, the direction of computation may be reversed. Furthermore, the method may be performed by moving the pixel down a column rather than down a row, and by generating row histograms, as opposed to column histograms.

Thus the values of the added column may be read and added into the running histogram, while the values of the removed column may be read and removed from the running histogram. These values may also be updated in a data structure, such as an array, storing the histogram for the current pixel.

The calculations for the next pixel may take the following exemplary form, although it is noted that the below pseudocode is shown for explanation purposes only.

//To remove the left column
for (y=−radius; y<=radius; y+=1){
    Running Histogram[pixel value at (x−radius, y)]−=1;
}
//To add the new right column
for (y=−radius; y<=radius; y+=1){
    Running Histogram[pixel value at (x+radius+1, y)]+=1;
    Column (x+radius+1) Histogram[pixel value at (x+radius+1, y)]+=1;
}

In 1206, the method may examine if there are any more pixels in the first row of the window. If there are, then the method may perform element 1204 again. If there are no more pixels in the first row, then the method may proceed with element 1208.

In 1208, if there are no more pixels in the first row, the method may calculate value for a first pixel in the next row. In some embodiments, the method may use the running array of histograms to update and sum the stored column histograms for the first pixel of each of the rows at twice the radius of the filter window and beyond. In other words, the column histograms within the neighborhood of the filter width may be updated, where the width of the neighborhood of the first pixel may be equal to the radius (R) number of columns on the left side, radius number of columns on the right side, and the one column the center pixel is on (thus 2×R+1).

In some embodiments, there may be padding pixels added to the edges of the image to enable proper calculations. In other words, if there is padding on the image, for the first pixel of each row, the method may update all the column histograms encapsulated in the window's width. After all these histograms are updated, all the updated column histograms may be summed to obtain to the histogram that represents the first pixel's neighborhood.

By updating the column histograms, the method may subtract a pixel value of the top pixel that the histogram represents and may add the new pixel value one below the bottom pixel that the histogram represents. See also the description above with reference to FIGS. 2-8.

Figure 9C:
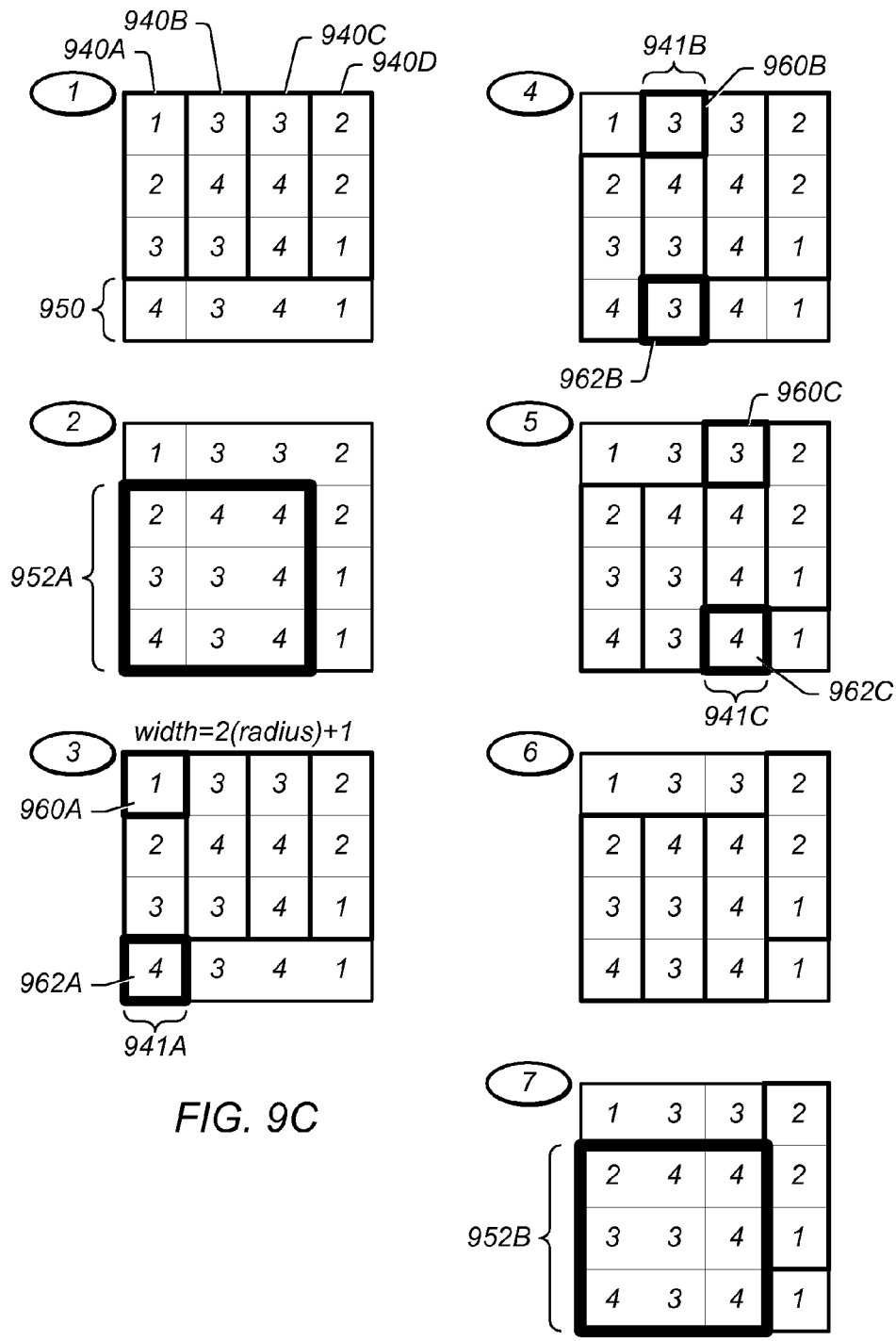
FIGS. 9C and 9D illustrate computing a new histogram in a window, according to some embodiments.

FIG. 9C shows an exemplary generation of a histogram of a new 3 by 3 area 952A using one or more of previously calculated column histograms 940A-D. Specifically, with regard to FIG. 9C, the method may operate to update the column histograms 940A-C for the width of the filter window, which in this example, is three pixels wide. As noted, the width of the window is exemplary only, and other widths may easily be used instead. The method may thus add a new bottom row 950 by updating its column histograms 940A-C.

For example, in FIG. 9C (3) a first new column 941A can be calculated by subtracting a first top pixel 960A and adding in a first bottom pixel 962A of the bottom row 950. Furthermore, in FIG. 9C (4) a second new column 941B can be calculated by subtracting a second top pixel 960B and adding in a second bottom pixel 962B of the bottom row 950. In FIG. 9C (5) a third new column 941C can be calculated by subtracting a third top pixel 960C and adding in a third bottom pixel 962C of the bottom row 950.

Figure 9D:
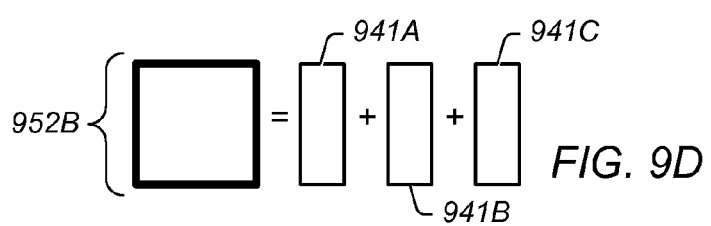

As illustrated in FIG. 9D and FIG. 9C (6)-(7), the method may then add all the column histograms 941A-C together to represent the first pixel of the row and its neighbors. By doing so, the algorithm may simply look at each value of a histogram index and add the values together. As a result, a new histogram of 3 by 3 area 952B may be formed.

In 1210, the method may calculate values for the remaining pixels in this row (i.e., remaining pixels that are not first pixels in a row that is not the first row). In some embodiments, the method may update the running array of histograms by taking a new column histogram (the right histogram) and subtract the pixel value of the top pixel that the histogram represents and adding a new pixel value one below the bottom pixel that the histogram represents. The method may then update the running histogram by taking the current histogram and subtracting the column on the left and adding the new column on the right. The method may examine each value of a histogram index and may add the right column and the current histogram values together. The method may also subtract the column histogram of the left from the current histogram index values.

Thus the current histogram may be updated during the adding and subtracting. In some embodiments, this method of updating the histograms may use constant time, i.e., independent of the kernel's radius size to update the column histograms from pixel to pixel.

The calculations for the next pixel may take the following exemplary form, although it is noted that the below pseudocode is shown for explanation purposes only.

//Updating running histogram
for (m=0; m<buckets; m+=1){
    //updates the column histogram at x+radius+1 (the new column)
    Column (x+radius+1) Histogram[pixel value at (x+radius+1, y−radius)]−=1;
    Column (x+radius+1) Histogram[pixel value at (x+radius+1, y+radius+1)]+=1;
    //adds the new column histogram and subtracts the left column histogram
    Running Histogram [m]+=Column (x+radius+1) Histogram [m];
    Running Histogram [m]−=Column (x−radius) Histogram [m];
}

In some embodiments, vectorization may be used to optimize this process by adding more than one index value at a time. Vectorization may be performed in elements 1208 and 1210 in order to speed up the calculations.

Vectorization may be performed by MultiMedia eXtension, Multiple Math eXtension/Matrix Math eXtension (MMX), STREAMING SIMD (Single Instruction, Multiple Data) EXTENSIONS (SSE), SSE2, SSE3, SUPPLEMENTAL STREAMING SIMD EXTENSIONS (SSSE3), SSSE4, 3DNOW!, and/or any other types of multimedia and/or floating point extensions. In some embodiments, the vectorization may be performed using parallel and/or distributed processing instead of, or in addition to, the aforementioned multimedia and/or floating point extensions.

In 1212, the method may decide if there are more pixels in the row currently being operated on. If there are, then the method may calculate a value for the next pixel in that row (see element 1210). In 1214, the method may decide if there are more rows in the filter window. If there are, then the method may calculate a value for a first pixel in the next row (see element 1208). Otherwise the method may perform a filtering operation and/or move the filtering window to a next location, such as one pixel to the side. This may be repeated until there are updated column histograms for all the pixels in the new filter window.

Spatial Weight Determination

Figure 9E:
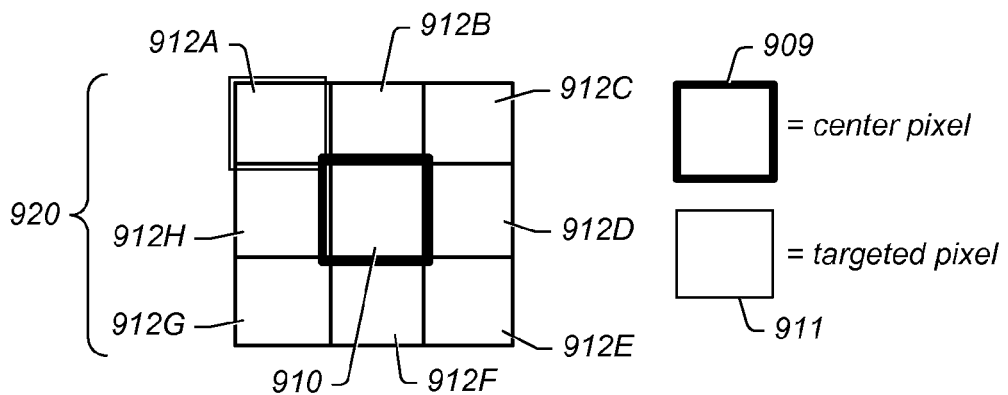
FIG. 9E illustrates an exemplary filter window, according to some embodiments.

In some embodiments, the method may use a running total spatial weight that accumulates the spatial weight contribution for most or all of the pixels in the filter window. Each of the elements may represent the specific histogram bucket's accumulated spatial weight. FIG. 9E illustrates an exemplary filtering window 920 that calculates the spatial weight coefficient for an exemplary 3 by 3 filtering window, but it can be easily extended to a 4 by 4 window, a 4 by 6 window, or any other size.

With respect to FIG. 9E, the method may use a center pixel 910 (marked by a thick border 909) and calculate a coefficient corresponding to the spatial weight of the pixels 912A-H in the filter window 920 outside of the center pixel 910. For example, as FIG. 9E shows, the method may first calculate a spatial coefficient for a first pixel 912A (marked by a border 911), and then calculate corresponding spatial coefficients for the remaining pixels 912B-H of the filter window 902. The method may not need to calculate a spatial weight coefficient for the center pixel 910.

Figure 13A:
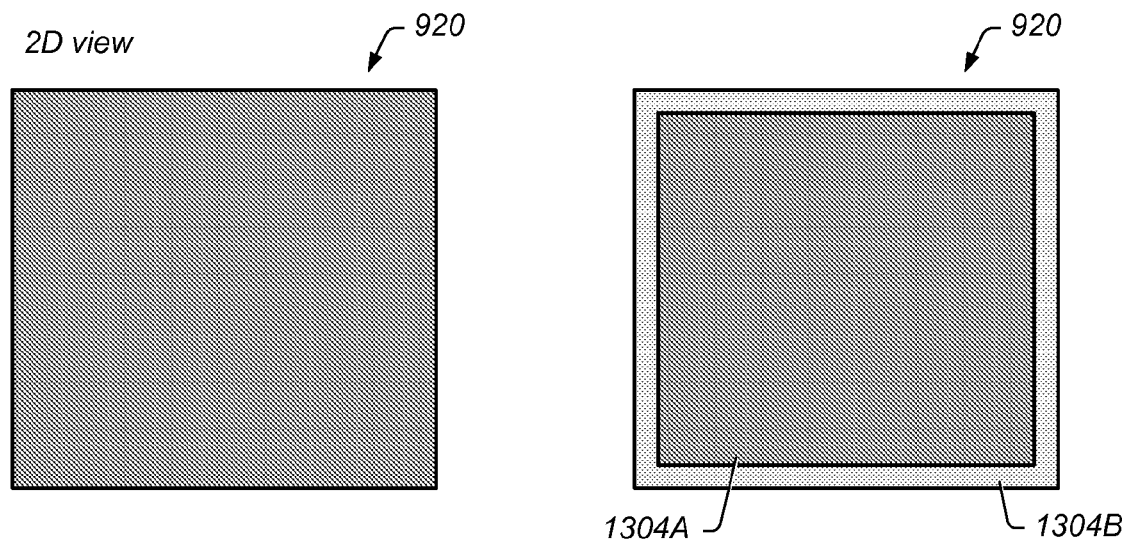
FIG. 13 illustrates comparison of exemplary filter windows with and without using spatial coefficients, according to some embodiments.
Figure 13A:
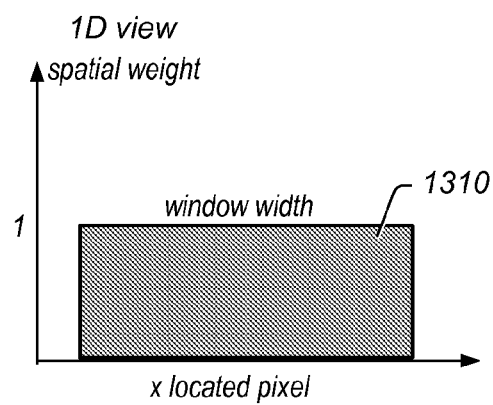
Figure 13B:
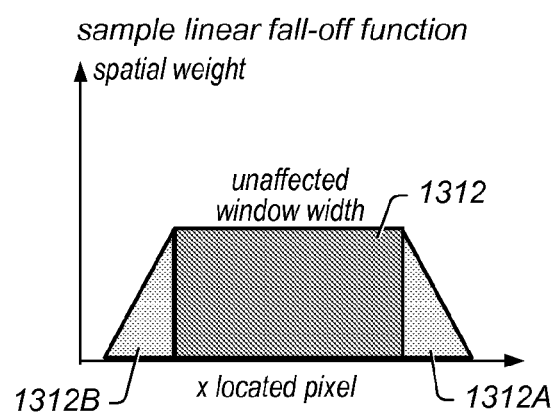

In some embodiments, for each center pixel 910, the spatial weight may be only used on the borders of the filter window 920, as illustrated by FIG. 13. In some embodiments, instead of using a sharp cut-off of spatial weights of FIG. 13A (as shown by the exemplary 2D filter representation 1302 and the 1D filter representation 1310), the method may use a fall-off function of spatial weights of FIG. 13B.

In FIG. 13A, the spatial weights have a uniform value, such as a value of "1", within the filter window 920, and the spatial weights may have a value of "0" outside of the filter window 920. This may cause unwanted artifacts such as ghosting (e.g., when a strong discontinuity of the box approximation of pixels included in the histogram calculation versus the pixels not included in the calculation).

In FIG. 13B, the spatial weights have a uniform value, such as a value of "1", within the inside 1304A of the filter window 920, and the spatial weights may have a value of "0" outside of the filter window 920. As discussed, the filter window may use a fall-off function (as seen by the area 1304B) that connects/bridges the spatial weights of 0 (outside of the filter) and a uniform value, such as a value of 1, (as seen in area 1304A of the 2-D view and area 1312 of the 1-D view). The 1-D view shows two areas 1312A-B that show an exemplary cross-section of the filter window 920 that uses one type of a fall-off function.

Also, instead of calculating spatial coefficients for all of the pixels in the filtering window, the calculation may be only performed on the border regions. In some embodiments, it may be inefficient to use the spatial weight for the whole window, such as because of possible slow operation. In some embodiments, the border region may be substantially close to the size of the filtering window without the center pixel. In some embodiments, calculation for the center pixel may also be performed, however, the distance difference would be 0 in that case. The reason for spatial weight artifacts may be a discontinuity from the spatial coefficient from a uniform value (e.g., of 1) to 0 (i.e., a uniform value of 1 inside the window and 0 outside the window).

The method may thus use a function that bridges the spatial weight coefficient between 1 and 0 (i.e., the contribution of the pixels in the main filter window and the pixels right outside or almost outside the filter window). In some embodiments, the user may be able to alter the amount of the window edge that should use this spatial weight coefficient calculation. In some embodiments, the method may calculate the optimal size of the border region by taking into account ghosting effects. In other words, the method may account that there's less ghosting when using more pixels (i.e., because more pixels are affected by weights), but using more pixels also slows down the output generation.

The method may use a running spatial weighted pixel histogram that represents the pixels that are affected by the spatial weight. For example, if there are 256 buckets, and there are five pixels in the border with a value of 0, then the first bucket may have a value of 5. The method may also use a running total spatial weight that accumulates the spatial weight contribution of most or all of the pixels in the filtering window (e.g., in the specified border region). Each of the elements of the running total spatial weight may represent the specific histogram bucket's accumulated spatial weight.

Figure 9F:
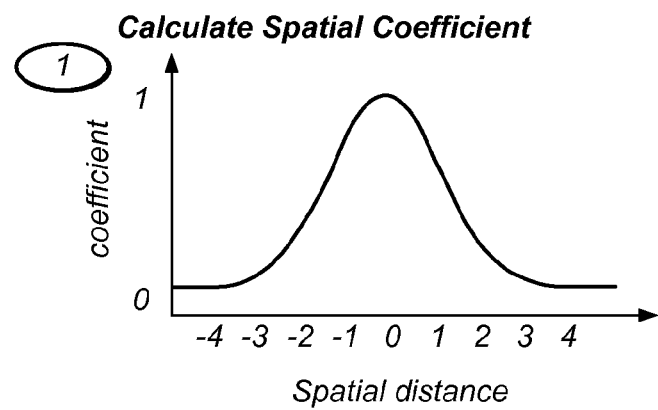
FIG. 9F illustrates exemplary distribution for a spatial coefficient, according to some embodiments.

The weight may be calculated by a function dependent on the distance from the pixel in question 909 to the center pixel 911. In some embodiments, the user may specify any function (linear, Gaussian, etc.) to determine the spatial weight of the border pixels, such as shown in FIG. 9F. The method may store pre-computed spatial coefficients using mathematical/statistical distribution, such as a Gaussian or a linear distribution, as shown in an exemplary distribution FIG. 9F. Thus FIG. 9 shows an exemplary Gaussian distribution of a spatial coefficient (y-axis) vs. spatial distance (x-axis). For example, when the spatial distance is 0, the pixel in question is the center pixel, and thus the spatial coefficient may have a value of 1.

Only the border pixels may be affected by the spatial weight, which the users can also control the number of pixels affected. As mentioned above, ghosting may be caused by the strong discontinuity of the box approximation of pixels inside versus outside the histogram calculation. By using borders, the method may optimize speed while eliminating any discontinuity that may causes ghosting.

The calculations for the spatial weight determination may take the following exemplary form, although it is noted that the below pseudo-code is shown for explanation purposes only.

```
weight (x difference, y difference) {
    coefficient={Gaussian, linear, or other functions} (x difference,y difference);
    return coefficient (ranges from 0 to 1);
}
for (all pixels in the borders of the window) {
    vat=pixel value at (x,y);
    Hist Weights Counter [val]+=1;
    HistWeightsSum [val]+=weight(centerx-x,centery-y);
}
```

Bilateral Filter

In some embodiments, the method may use the calculated histograms and spatial and color range coefficients to calculate an output value. In other words, the method may calculate an output value for each center pixel of a filtering window by using the current running histogram and considering one or more of the color range and spatial coefficients for each pixel.

Color Range Coefficient

Figure 9G:
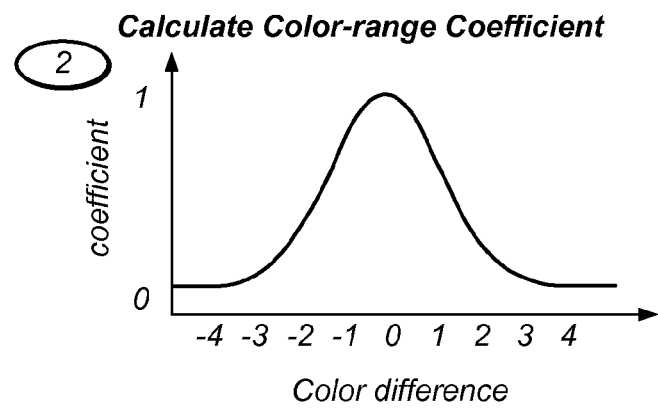
FIG. 9G illustrates exemplary distribution for a color range coefficient, according to some embodiments.

In some embodiments, the method may store pre-computed color coefficients using mathematical/statistical distribution, such as a Gaussian or a linear distribution (see exemplary distribution FIG. 9G). In some embodiments, the method may compute one color (range) coefficient for each pixel, although a single color (range) coefficient may also be used for two or more pixels. To determine which color coefficients may be used for a current pixel, the method may calculate the difference between the current pixel value that the filter is parsing with and the index value of the histogram.

For example, with reference to FIG. 9E, the method may operate to calculate a color range coefficient for each pixel 912A-H. Each of the pixels may represent the specific histogram bucket's accumulated color weight. FIG. 9E illustrates an exemplary filtering window 920 that calculates the color weight coefficient for an exemplary 3 by 3 filtering window, but it can be easily extended to a 4 by 4 window, a 4 by 6 window, or any other size.

With respect to FIG. 9E, the method may use a center pixel 910 (marked by a thick border 909) and calculate a coefficient corresponding to the color weight of the pixels 912A-H in the filter window 920 outside of the center pixel 910. For example, as FIG. 9E shows, the method may first calculate a color coefficient for a first pixel 912A (marked by a border 911), and then calculate corresponding color coefficients for the remaining pixels 912B-H of the filter window 902. The method may not need to calculate a color weight coefficient for the center pixel 910.

In some embodiments, the coefficient for each pixel may be calculated as follows:

1. Sum+=(spatial)×(color range)×(color value of the target pixel)
2. Normalized+=(spatial)×(color range)
3. Output value=Sum/Normalized Where the variable "spatial" is spatial difference between the center pixel 910 (marked by 909) and the targeted pixel marked by 911; the "color range" is the color difference between the center pixel 910 (marked by 909) and the targeted pixel marked by 911. In some embodiments other calculations for the color coefficients are contemplated.

Each pixel in the image, and thus in the filter window area, may have associated color channels, e.g., have an associated color space. For example, each pixel may have an associated Red, Green, and Blue (RGB) value. In some embodiments more than one color space may be used for one or more of the pixels in the image and/or in the selected image area.

The one or more color spaces may include the Hue, Saturation, and Value (HSV) color space, the Lab Color Space (CIELAB), the International Commission on Illumination 1931 XYZ color space (CIEXYZ), any of the variants of the CIE XYZ color space, the RGB Alpha (RGBA) color space, any of the variants of the Cyan, Magenta, Yellow, and Key (CMYK) color space, the YIQ (luma/luminance, in-phase, and quadrature components) color space, the YPbPr color space, any of the variants of YUV (luma/luminance and two chrominance color components) color space, any of the variants of the YCC (luma/luminance and chroma components) color space, the Hue, Saturation, and Brightness (HSB) color space, the Hue, Saturation, and Lightness/Luminance (HSL) color space, the Munsell color system, the Natural Color System (NCS), the RG Chromaticity space, the color space used in the Human Visual System Model (HVS), and/or any other color space system used to denote color values of pixels in an image.

For example, for each difference in value of a given color space between two pixels (such as between pixels shown in FIG. 9E), the coefficient may represent a part of the Gaussian distribution (such as shown in FIG. 9G), or any other distribution as mentioned above. In some embodiments, if the difference in value is high, the color coefficient may be low, and vice versa. The method may specify the weight value of that pixel by determining a color range coefficient for each part of the histogram. For example, for each index of the histogram, the method may multiply the number of pixels that fall in to the specific index and multiply it with the color coefficient.

Spatial Weight Coefficient

In some embodiments, the method may calculate a spatial weight coefficient using the spatial weight distribution calculated above. In some embodiments, the spatial weight coefficient and the spatial weight distribution may be calculated in a single step. As mentioned above, the use of the spatial weight coefficient may operate to eliminate ghosting in the resultant image. In some embodiments, the spatial weight coefficient may be calculated using the running spatial weight histogram (i.e., which may represent the pixels affected by the spatial weight) and the spatial weight sum, as described above.

To calculate this coefficient for a particular bucket (e.g., bucket m), the method may assume that pixels not affected by the spatial weights have a spatial coefficient of substantially close to one. However, use of other default spatial weights is also contemplated. The method may operate to add the number of pixels not affected by the weights of the bucket m with the sum of spatial weight at the bucket m. The method may divide this summation by the total number of pixels that are affected and not-affected by the spatial weight.

The method may calculate an average coefficient, and as a result, the pixels that are spatially far from the center may not contribute as much as the pixels that are close to the center pixel of the filtering window. Thus the method use both spatial and color-range coefficients to determine which pixels should contribute (i.e., be used for calculating) to the output pixel. As mentioned above, the spatial weight coefficient may only be calculated for a border region of a filter window, and the interior portion of the filter window may have uniform values that may be automatically assigned without any calculations.

Filter

In some embodiments, the method may perform a bilateral filtering operation on the image. However, the use of histograms and of the spatial and/or color coefficient may be used for other operations, such as changing the color tone, enhancing textures, and other operations that may use histograms, i.e., any type of a statistically based filters. Furthermore, the spatial-coefficient may be used for a Gaussian blur or other blurs that require a spatial fall-off. Thus although the description mentions a bilateral filter, the inclusion of the bilateral filter is exemplary only, and other bilateral operations and/or statistical filters may be used in addition to, or instead of, the bilateral filter. Furthermore, in some embodiments, other coefficients may be used in addition to, or instead of, the spatial and color coefficients.

The method may accumulate a summation that may multiply the index value with the coefficient(s), which accounts for both spatial and color range determinations, with the number of pixels that fall in the specified index. The method may accumulate the normalization factors by summing all the coefficients multiplied by the number of pixels represented in the specified index. In other words, as discussed above with reference to FIG. 9G, the method may sum the product of a color value of each pixel (which may use the value calculated in the histograms) and the color and spatial coefficients of each respective pixel.

The calculations for the spatial weight determination may take the following exemplary form, although it is noted that the below pseudo-code is shown for explanation purposes only.

val=centerpixel value of (x,y)
    for (m=0; m<buckets; ++m) {
        spatial weight=(# of pixels not affected by weights at bucket m+HistWeightsSum [m])÷(total #, including affected and not affected by weights, of pixels at bucket m)
        Weight=(coefficient as a function of val-m)*(total # of pixels represented at bucket m);
        Weight*=(spatial weight);
        summation+=m*Weight;
        normalization+=Weight;
    }
Final Image Pixel at (x,y)=summation/normalization;

As a result, the method may optimize the use of pixels in the filter window. For example, for pixels that do not lie on the edges of the filter window may be optimized through the mathematical use of histograms, as explained above, while those pixels on the edges may be calculated based on their spatial weight.

In some embodiments, the methods described herein may be implemented using a hierarchy of histograms to represent an input image for use in various filtering operations. For example, in one embodiment, a second histogram may be generated that includes one-eighth the number of histogram values as the number of bucket values stored in a first histogram (e.g., each bucket in the second histogram may store a count of the number of pixels having a value in a range of 8 pixel values). In such embodiments, a method for median filtering may first perform histogram convolution on this second histogram to perform a coarse filtering operation (e.g., the method may examine the counts for these coarse buckets in order to narrow down the range buckets in which to search for the median bucket value), and then a finer filtering operation may be performed to identify the particular bucket value within that range of bucket values that is the median value.

Figure 10A:
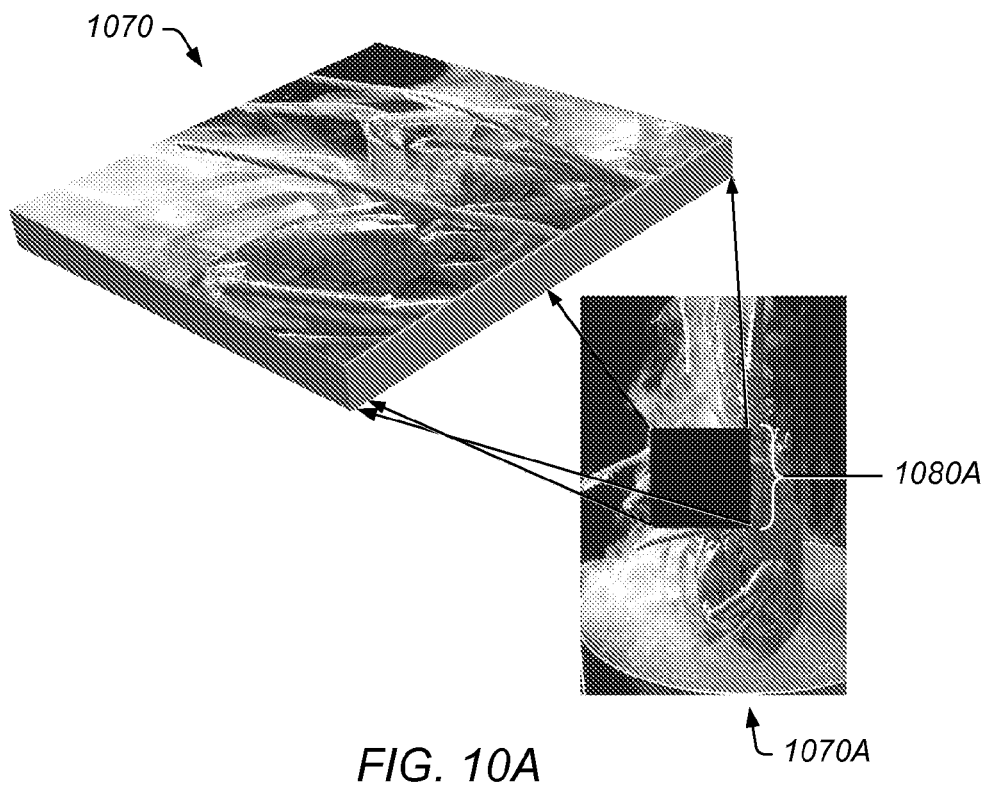
FIGS. 10A-B illustrate exemplary use of a filter window with and without using spatial coefficients, according to some embodiments.
Figure 10B:
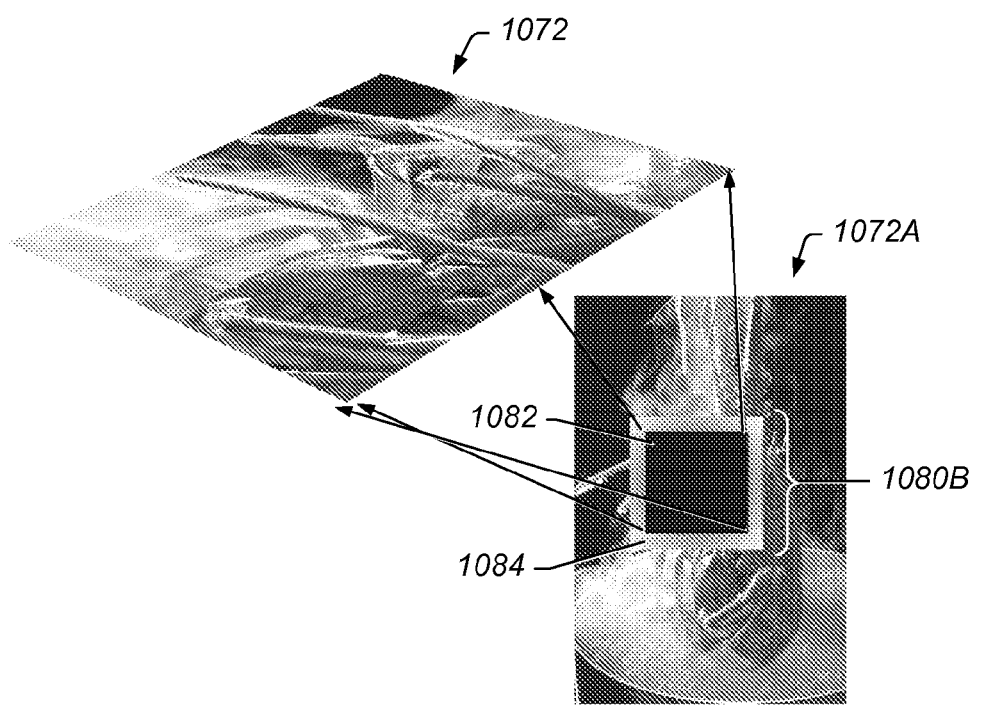

FIGS. 10A-B illustrate exemplary use of a filter window with and without using spatial coefficients, according to some embodiments. FIG. 10A illustrates an exemplary filter window 1080A without using spatial coefficients being applied to an image 1070A. As the top filtered image 1070 (which is a portion of the image 1070A) shows, there are artifacts in the filtered image due to discontinuities in the filter window 1080A (i.e., between the filter window and the rest of the image). In other words, the filter window 1080A uses regular coefficients that have a sharp drop-off (or a discontinuity).

In contrast, FIG. 10B illustrates an exemplary use of a filter window with spatial coefficients. FIG. 10B illustrates an exemplary filter window 1080B that uses spatial coefficients being applied to an image 1072A. The top filtered image 1072 (which is a portion of the image 1072A) shows more detail thanks to the gradual fall-off 1084 (i.e., between regions 1082 and the rest of the image being filtered) in the border 1084 of the filter window 1080B. Examples of a gradual fall-off include linear and Gaussian fall-offs, but other functions can be used. Thus the interior portion 1082 of the filter window may have uniform values, such as of 1, but other uniform values are contemplated.

In some embodiments, the type of the fall-off can be user-selected and/or suggested or automatically chosen by the application/filter itself. In some embodiments, the size of the border region 1084 of the filter window 1080B can be user-selected and/or suggested or automatically chosen by the application/filter itself. In some embodiments, user and/or the application/filter itself can select whether to use the fall-off border region on all 4 sides of the filter box 1080B or one, two, or three sides only. In this example, any type of a filter can be applied to the filter window 1080B, such as a bilateral filter.

Figure 11:
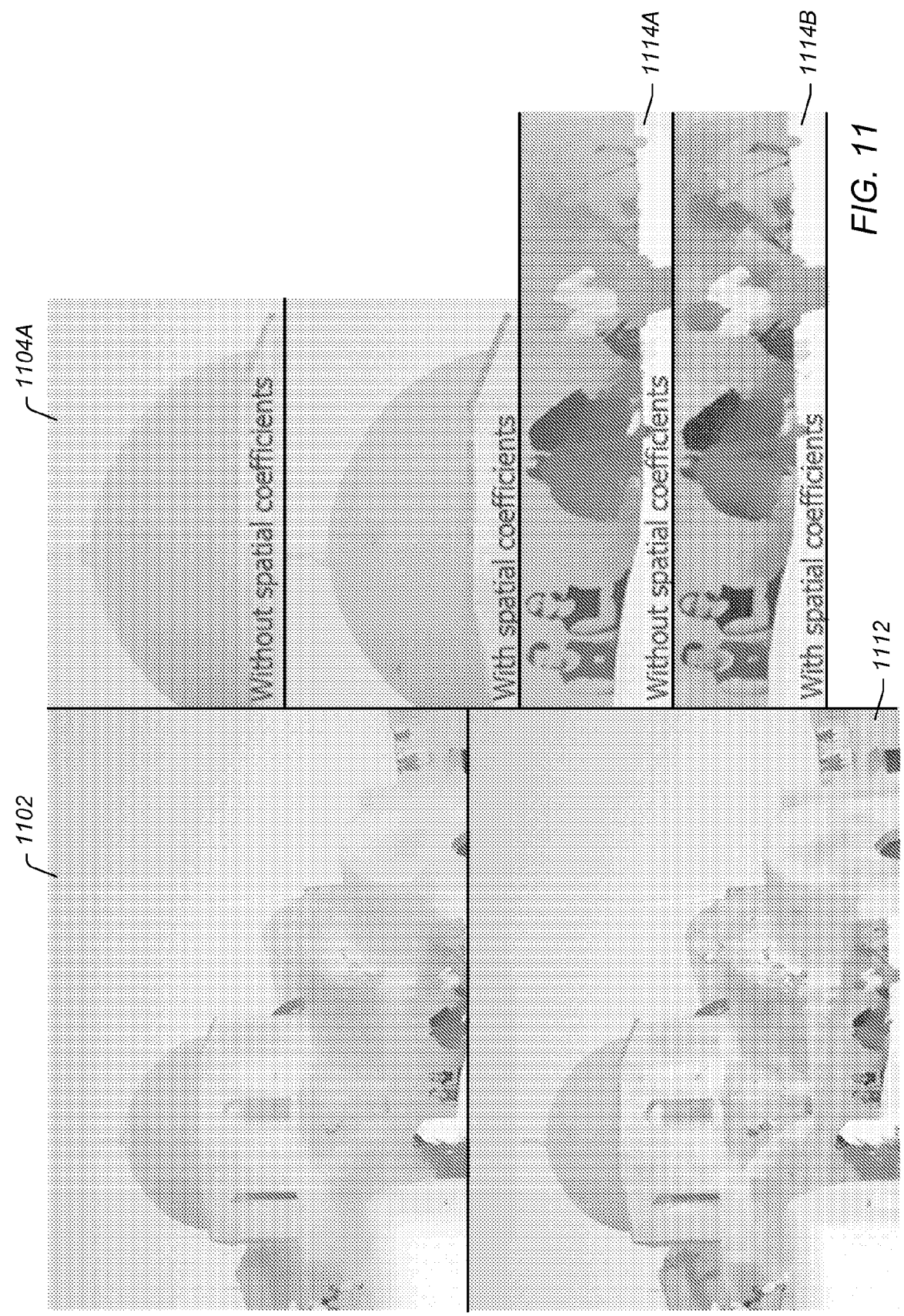
FIG. 11 illustrates comparison of exemplary uses of a filter with and without using spatial coefficients, according to some embodiments.

FIG. 11 illustrates comparison of exemplary uses of a filter with and without using spatial coefficients, according to some embodiments. The top image 1102 shows some embodiments of applying a bilateral filter (e.g., without using color coefficients) with and without using spatial coefficients. The exemplary filter may use a radius of 21, with a surface blur value of 20, for an original image of 876 by 584 pixels. As an exemplary filtered result of a dome shows, the use of a filter (e.g., a bilateral filter) without spatial coefficients 1104A may result in ghosting, resulting in the sky near the dome appearing purple and the cross in the original image becoming faded. In contrast, use of spatial coefficients (e.g., a graded fall-off in the border region of the filter window) may result in better color and edge preservation as seen in the exemplary FIG. 1104B.

The bottom image 1112 shows an exemplary method of applying a bilateral filter (e.g., using color coefficients) with and without using spatial coefficients. The exemplary filter may use a radius of 21, with a surface blur value of 20, for an original image of 876 by 584 pixels. As an exemplary filtered image 1114A shows, the use of a filter (e.g., a bilateral filter) without spatial coefficients may result in ghosting; which may result in the colors of the people being lighter and some red pixels appearing in the women's face. In contrast, as an exemplary filtered image 1114B shows, the use of spatial coefficients (e.g., a graded fall-off in the border region of the filter window) may result in better color and edge preservation; this result may not have any extra red pixel artifacts.

Figure 12:
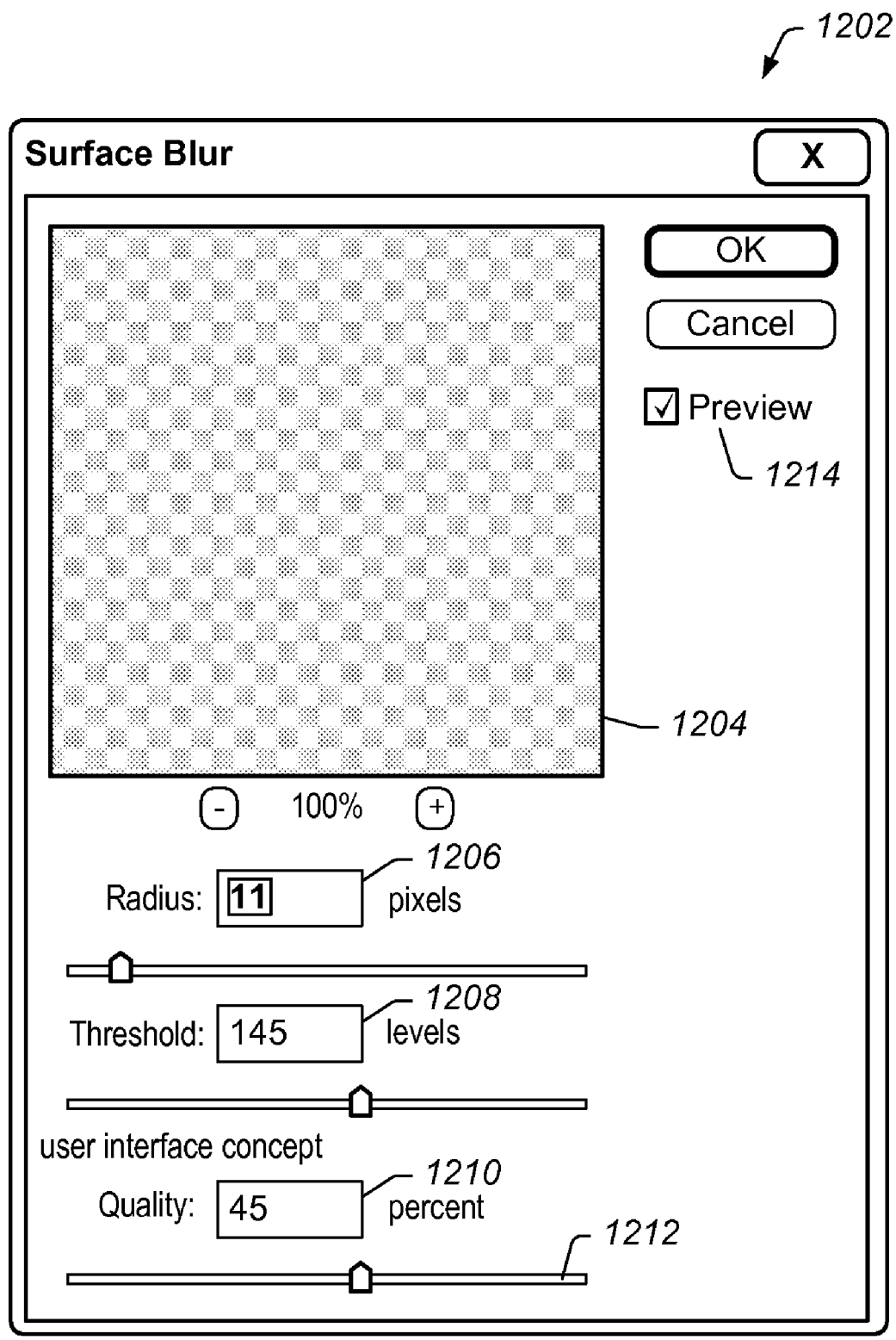
FIG. 12 illustrates an exemplary GUI for user-defined characteristics of a filter window, according to some embodiments.

FIG. 12 illustrates an exemplary graphical user interface (GUI) 1202 for user-specified characteristics of a filter window, according to some embodiments. The user may be able to select the radius 1206 of the filter window, the threshold (i.e., tolerance) value 1208, and/or the quality value 1210. One or more of these user-specified characteristics may be defined using a slider 1212.

The quality value 1210 may adjust the size of the area that accounts for the spatial weight. For example, with reference to FIG. 10, the quality value 1210 may adjust the gray area 1084 of FIG. 10 that accounts the spatial fall off If the quality is 100%, the spatial weight fall-off may account for the whole filter window 1080B. If the quality is 20%, the spatial weight fall-off may account only for 20% of the edge pixels. In some embodiments, the user may be able to select the size and/or shape of the border fall-off region (such as region 1084 of the filter window 1080B of FIG. 10), such as by selecting the pixels in the representation of the filter window 1204 and their relative spatial weight. The remaining interior portion of the filter may have uniform spatial coefficient values.

In some embodiments, the quality parameter may be tuned by the user, or it may be performed automatically by the application. Thus the quality parameter may be operable to select the intended computational complexity of the filter. In some embodiments, quality parameter may allow a user to choose between speed and quality of the filtering operation. In some embodiments, the quality parameter may adjust the size of the area of the filter window that accounts for the spatial weight. In some embodiments, a quality of 100% may select a highest possible amount of edge pixels while still maintaining some speed requirement (e.g., application and/or user defined).

Furthermore, the user may decide whether to use adaptive tolerance or user-specified tolerance. Tolerance may define how susceptible color differences of two pixels can affect each other. For example, when there is a higher tolerance, even with high color differences, the two pixels may affect each other in the filter operation (e.g., a blur filter). When there is a lower tolerance, even with a little color difference, the two pixels may not affect each other. For example, in some embodiments the user may select an "Adaptive Tolerance" option for the filter (e.g., a bilateral filter). In some embodiments, the selection of the automatic adaptive tolerance option may operate to automatically determine the tolerance for finding/detecting edges in the selected image area.

If manual tolerance is selected, the application (e.g., the image processing application) may accept user input specifying manual tolerance. In some embodiments the manual tolerance may be selected when a user disables the adaptive tolerance option, but an explicit selection of manual tolerance is contemplated. In some embodiments, the application may suggest an automatic tolerance value to the user, who then may use the automatic tolerance (e.g., calculated using the adaptive tolerance option), or may manually override the adaptive tolerance suggestion. In some embodiments, the actual tolerance used by the application may be substantially equal to the user-input tolerance (e.g., in percentage from 0 to 100) multiplied by a maximum Y channel value of the YCC color space (e.g. in an 8-bit case, the maximum Y channel value is 255). In some embodiments, the user-input tolerance may use another scale, such as 0-10, 0-255, 0-1000, or any other scale. In some embodiments, the user-input tolerance may be directly used without scaling by the maximum Y channel value. In some embodiments, the user-input tolerance may be scaled using another channel, such as when the application uses a different color space and/or the RGB values directly. As mentioned above, the method may also use luminance instead of the luma value when using the YCC color space, or any other combination of color channels that may provide an estimate of the luminance of pixels.

In some embodiments, the user may use a graphical user interface (GUI) to select the desired tolerance (threshold) values. The GUI 1202 may provide the user with a separate window (such as shown in FIG. 12) where the user can experiment with the tolerance (threshold) values until a desired tolerance (threshold) is found. An example of the GUI 1202 is shown in FIG. 12, but other implementations are contemplated. In addition, the application program may give the user a choice of what the filtered portion of the image would look like (e.g., using the "Preview" option 1214) using the user-selected tolerance/threshold and by using the adaptive tolerance/threshold option.

Figure 14:
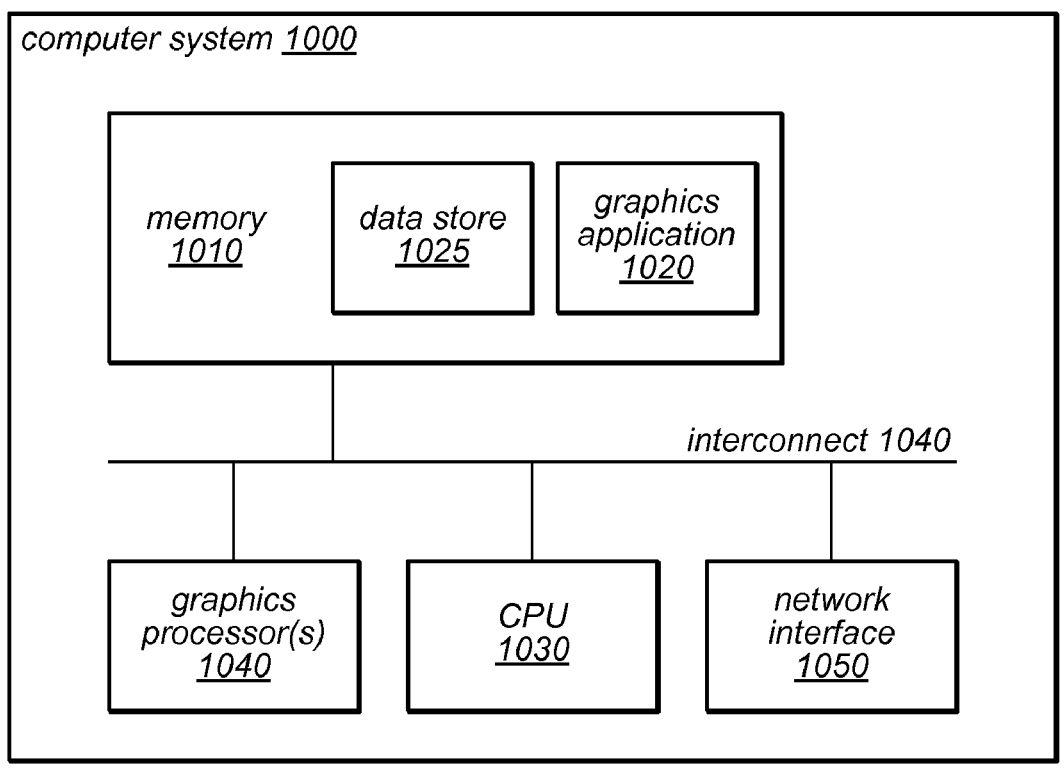
FIG. 14 is a block diagram illustrating some embodiments of a computer system suitable for implementing the methods described herein.

FIG. 14 is a block diagram illustrating one embodiment of a computer system 1000 suitable for implementing the methods for convolution-based image filtering and sparse histogram merging described herein. A computer system 1000 may include a processor unit (CPU) 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, EEPROM, or other memory type), an interconnect 1040 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof. The CPU 1030, the network interface 1050, and the memory 1010 may be coupled to the interconnect 1040. It should also be noted that one or more components of system 1000 might be located remotely and accessed via a network. One or more of the memories 1010 may embody a graphics application 1020.

A graphics application such as graphics application 1020 may be configured to perform convolutions on image data as part of various filtering functions and to render new images according to the convolutions. For example, graphics application 1020 may perform median filtering, box bilateral filtering, or other filtering operations by performing convolutions on the pixel values of an input image using various histograms and/or acceleration data structures (e.g., macro arrays indicating non-zero histogram entries), according to various embodiments. Graphics application 1020 may be configured to render the second image to a separate window (such as a compositing or layered window) or directly into the same frame buffer containing the original image, in different embodiments.

Graphics application 1020 may represent various types of graphics applications, such as painting, publishing, photography, games, animation, and other applications. Additionally, graphics application 1020 may utilize a graphics processor 1040 when rendering or displaying images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1040 may implement a number of graphics primitive operations in a way that makes executing them much faster than drawing directly to the screen with a host central processing unit (CPU), such as CPU 1030.

As described above, the methods disclosed herein for computing region histograms, column histograms, and acceleration data structures and/or the methods disclosed herein for performing histogram-based convolutions merging on multiple kernels of an image and/or sparse histogram may be implemented by program instructions configured for parallel execution on two or more such GPUs.

Please note that functionality and/or features described herein as being part of, or performed by, graphics application 1020 may, in some embodiments, be part of, or performed by, one or more graphics processors, such as graphics processor 1040. As described above, in some embodiments graphics application 1020 may be configured to render altered images into a separate image layer or separate layered window than input images.

Histogram-based convolution and sparse histogram merging, as described herein, may be implemented on various types of computer systems. Referring again to FIG. 14, computer system 1000 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 1020 described herein may be provided as a computer program product, or software, that may include a computer-readable storage medium having stored thereon instructions, which may be used to program a computer system (or other electronic devices) to implement the methods described herein. A computer-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums).

In some embodiments, memory 1010 may include program instructions configured to implement graphics application 1020, as described herein. Graphics application 1020 may be implemented in any of various programming languages or methods. For example, in one embodiment, graphics application 1020 may be JAVA based, while in another embodiments, it may be implemented using the C or C++ programming languages. In other embodiments, graphics application 1020 may be implemented using specific graphic languages specifically for developing programs executed by specialize graphics hardware, such as GPU 1040. In addition, graphics application 1020 may be embodied on memory specifically allocated for use by graphics processor(s) 1040, such as memory on a graphics board including graphics processor(s) 1040. Thus, memory 1010 may represent dedicated graphics memory as well as general-purpose system RAM.

Memory 1010 may in some embodiments also include a data store 1025. Data store 1025 may be configured to store image data for one or more input images and/or filtered output images, in various embodiments. Data store 1025 may also be configured to store histogram information (e.g., bucket values for one or more region or column histograms), and/or macro array information (e.g., array entries indicating non-zero bucket values in a histogram), in some embodiments. Information stored in data store 1025 may be organized in any of various data structures, such as in one or more tables, databases, or arrays, and/or may be included in one or more files of any suitable computer-readable format, in various embodiments. Other information not described herein may be included in memory 1010 and/or data store 1025 and may be used to implement the methods described herein and/or other functionality of computer system 1000.

Network interface 1040 may be configured to enable computer system 1000 to communicate with other computers, systems or machines, such as across network 100, described above. Network interface 1040 may use standard communications technologies and/or protocols. Network 100 may include, and network interface 1040 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1040 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1040 may be implemented in a number of different physical forms. For example, GPU 1040 may take the form of a dedicated graphics card, an integrated graphics solution and/or a hybrid solution. GPU 1040 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 14, memory 1010 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth.

Hybrid solutions also share memory with the system memory, but have a smaller amount of memory on-board than discrete or dedicated graphics cards to make up for the high latency of system RAM. Data communicated between the graphics processing unit and the rest of the computer may travel through the graphics card slot or other interface, such as interconnect 1040 of FIG. 14.

While graphics application 1020, which may implement integral histogram convolution and/or sparse histogram merging, has been described herein with reference to various embodiments, it will be understood that these embodiments are illustrative and that the scope of the present invention is not limited to them. Many variations, modifications, additions, and improvements are possible. More generally, the present invention is described in the context of particular embodiments. For example, the blocks and logic units identified in the description are for ease of understanding and not meant to limit the invention to any particular embodiment. Functionality may be separated or combined in blocks differently in various realizations or described with different terminology.

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A computer-implemented method for filtering of digital images, comprising:
    applying a filter window to a first portion of an image, wherein said applying operates on a first plurality of pixels comprised in the first portion of the image, wherein the filter window comprises an interior region comprising a second plurality of pixels and a border region comprising a third plurality of pixels;
    generating a plurality of histograms, wherein the plurality of histograms describe pixel values corresponding to the first plurality of pixels;
    generating a plurality of spatial weight coefficients for the third plurality of pixels to generate a spatial weight coefficient for each pixel of the third plurality of pixels, wherein spatial weight coefficients for each of the second plurality of pixels have a uniform value;
    generating a plurality of color weight coefficients for the first plurality of pixels to generate a color weight coefficient for each pixel of the first plurality of pixels; and
    performing a filtering operation on the first plurality of pixels, wherein said performing comprises applying a respective spatial weight coefficient and a respective color weight coefficient to the corresponding pixel values described in the plurality of histograms for each respective pixel of the first plurality of pixels.

2. The method of claim 1,
    wherein the plurality of spatial weight coefficients bridge values of weight of pixels outside the filter window and the spatial weight of the second plurality of pixels; and
    wherein a spatial weight coefficient for each of the pixels outside the filter window has a value of 0.

3. The method of claim 1,
    wherein the first plurality of pixels of the filter window comprises a center pixel and a plurality of surrounding pixels;
    wherein each color weight coefficient corresponds to a color difference between a respective pixel of the plurality of the surrounding pixels and the center pixel.

4. The method of claim 3,
    wherein color tolerance operates to determine strength of a color weight coefficient between the respective pixel of the plurality of the surrounding pixels and the center pixel; and
    wherein the color tolerance is user-selectable.

5. The method of claim 1,
    wherein the first plurality of pixels comprises the second and third plurality of pixels.

6. The method of claim 1,
    wherein the size of the border region is user-selectable.

7. The method of claim 1,
    receiving one or more selections characterizing operation of the filter window from a graphical user interface (GUI).

8. The method of claim 7,
    wherein the GUI provides preview functionality that operates to display results of the filtering operation prior to said performing the filtering operation.

9. The method of claim 1,
    wherein said first portion of an input image comprises a rectangular region;
    wherein said generating the plurality of histograms for the rectangular region comprises:
        generating a plurality of column histograms for the first plurality of pixels, wherein each pixel of the first plurality of pixels comprises an associated column histogram.

10. The method of claim 1, further comprising:
    wherein performing operates to generate an output pixel;
    applying the filter window to rest of the image to generate a plurality of output pixels;
    rendering a result image using the plurality of the output pixels.

11. A system comprising:
    one or more processors; and
    a memory coupled to the one or more processors, wherein the memory stores program instructions executable by the one or more processors to implement:
        applying a filter window to a first portion of an image, wherein said applying operates on a first plurality of pixels comprised in the first portion of the image, wherein the filter window comprises an interior region comprising a second plurality of pixels and a border region comprising a third plurality of pixels;
        generating a plurality of histograms, wherein the plurality of histograms describe pixel values corresponding to the first plurality of pixels;
        generating a plurality of spatial weight coefficients for the third plurality of pixels to generate a spatial weight coefficient for each pixel of the third plurality of pixels, wherein spatial weight coefficients for each of the second plurality of pixels have a uniform value;
        generating a plurality of color weight coefficients for the first plurality of pixels to generate a color weight coefficient for each pixel of the first plurality of pixels; and
        performing a filtering operation on the first plurality of pixels, wherein said performing comprises applying a respective spatial weight coefficient and a respective color weight coefficient to the corresponding pixel values described in the plurality of histograms for each respective pixel of the first plurality of pixels.

12. The system of claim 11,
    wherein the plurality of spatial weight coefficients bridge values of weight of pixels outside the filter window and the spatial weight of the second plurality of pixels; and
    wherein a spatial weight coefficient for each of the pixels outside the filter window has a value of 0.

13. The system of claim 11,
    wherein the first plurality of pixels of the filter window comprises a center pixel and a plurality of surrounding pixels;
    wherein each color weight coefficient corresponds to a color difference between a respective pixel of the plurality of the surrounding pixels and the center pixel.

14. The system of claim 13,
wherein color tolerance operates to determine strength of a color weight coefficient between the respective pixel of the plurality of the surrounding pixels and the center pixel; and
wherein the color tolerance is user-selectable.

15. The system of claim 11,
wherein the first plurality of pixels comprises the second and third plurality of pixels.

16. The system of claim 11,
wherein the size of the border region is user-selectable.

17. The system of claim 11, wherein the program instructions are further executable by the one or more processors to implement:
receiving one or more selections characterizing operation of the filter window from a graphical user interface (GUI).

18. The system of claim 17,
wherein the GUI provides preview functionality that operates to display results of the filtering operation prior to said performing the filtering operation.

19. The system of claim 11,
wherein said first portion of an input image comprises a rectangular region;
wherein said generating the plurality of histograms for the rectangular region comprises:
generating a plurality of column histograms for the first plurality of pixels, wherein each pixel of the first plurality of pixels comprises an associated column histogram.

20. The system of claim 11, wherein the program instructions are further executable by the one or more processors to implement:
wherein performing operates to generate an output pixel;
applying the filter window to rest of the image to generate a plurality of output pixels;
rendering a result image using the plurality of the output pixels.

21. A non-transitory computer-readable storage medium storing program instructions executable to implement:
applying a filter window to a first portion of an image, wherein said applying operates on a first plurality of pixels comprised in the first portion of the image, wherein the filter window comprises an interior region comprising a second plurality of pixels and a border region comprising a third plurality of pixels;
generating a plurality of histograms, wherein the plurality of histograms describe pixel values corresponding to the first plurality of pixels;
generating a plurality of spatial weight coefficients for the third plurality of pixels to generate a spatial weight coefficient for each pixel of the third plurality of pixels, wherein spatial weight coefficients for each of the second plurality of pixels have a uniform value;
generating a plurality of color weight coefficients for the first plurality of pixels to generate a color weight coefficient for each pixel of the first plurality of pixels; and
performing a filtering operation on the first plurality of pixels, wherein said performing comprises applying a respective spatial weight coefficient and a respective color weight coefficient to the corresponding pixel values described in the plurality of histograms for each respective pixel of the first plurality of pixels.

22. The non-transitory computer-readable storage medium of claim 21,
wherein the plurality of spatial weight coefficients bridge values of weight of pixels outside the filter window and the spatial weight of the second plurality of pixels; and
wherein a spatial weight coefficient for each of the pixels outside the filter window has a value of 0.

23. The non-transitory computer-readable storage medium of claim 21,
wherein the first plurality of pixels of the filter window comprises a center pixel and a plurality of surrounding pixels;
wherein each color weight coefficient corresponds to a color difference between a respective pixel of the plurality of the surrounding pixels and the center pixel.

24. The non-transitory computer-readable storage medium of claim 23,
wherein color tolerance operates to determine strength of a color weight coefficient between the respective pixel of the plurality of the surrounding pixels and the center pixel; and
wherein the color tolerance is user-selectable.

25. The non-transitory computer-readable storage medium of claim 21,
wherein the first plurality of pixels comprises the second and third plurality of pixels.

26. The non-transitory computer-readable storage medium of claim 21,
wherein the size of the border region is user-selectable.

27. The non-transitory computer-readable storage medium of claim 21,
receiving one or more selections characterizing operation of the filter window from a graphical user interface (GUI).

28. The non-transitory computer-readable storage medium of claim 27,
wherein the GUI provides preview functionality that operates to display results of the filtering operation prior to said performing the filtering operation.

29. The non-transitory computer-readable storage medium of claim 21,
wherein said first portion of an input image comprises a rectangular region;
wherein said generating the plurality of histograms for the rectangular region comprises:
generating a plurality of column histograms for the first plurality of pixels, wherein each pixel of the first plurality of pixels comprises an associated column histogram.

30. The non-transitory computer-readable storage medium of claim 21, wherein the program instructions are further executable to implement:
wherein performing operates to generate an output pixel;
applying the filter window to rest of the image to generate a plurality of output pixels; and
rendering a result image using the plurality of the output pixels.

31. A computer-implemented method for filtering of digital images, comprising:
executing instructions on a specific apparatus to perform applying a filter window to binary digital electronic signals representing a first portion of an image, wherein said applying operates on a first plurality of pixels comprised in the first portion of the image, wherein the filter window comprises an interior region comprising a second plurality of pixels and a border region comprising a third plurality of pixels;

executing instructions on a specific apparatus so that binary digital electronic signals representing a plurality of histograms are generated, wherein the plurality of histograms describe pixel values corresponding to the first plurality of pixels;

executing instructions on said specific apparatus so that binary digital electronic signals representing a plurality of spatial weight coefficients are generated for the third plurality of pixels to generate a spatial weight coefficient for each pixel of the third plurality of pixels, wherein spatial weight coefficients for each of the second plurality of pixels have a uniform value;

executing instructions on said specific apparatus so that binary digital electronic signals representing color weight coefficients are generated for each of the first plurality of pixels;

executing instructions on said specific apparatus to implement performing a filtering operation on the first plurality of pixels, wherein performing comprises applying a respective spatial weight coefficient and a respective color weight coefficient to the corresponding pixel values described in the plurality of histograms for each respective pixel of the first plurality of pixels; and storing a result of the filtering operation in a memory location of said specific apparatus for later use.

* * * * *